United States Patent
Donnelly

(10) Patent No.: US 8,428,796 B2
(45) Date of Patent: Apr. 23, 2013

(54) RAIL CONVEYANCE SYSTEM FOR MINING

(76) Inventor: Frank Wegner Donnelly, North Vancouver (CA)

(*) Notice: Subject to any disclaimer, the term of this patent is extended or adjusted under 35 U.S.C. 154(b) by 716 days.

(21) Appl. No.: 12/589,396

(22) Filed: Oct. 19, 2009

(65) Prior Publication Data
US 2010/0114404 A1 May 6, 2010

Related U.S. Application Data

(60) Provisional application No. 61/106,340, filed on Oct. 17, 2008.

(51) Int. Cl.
*G05D 1/00* (2006.01)

(52) U.S. Cl.
USPC ................................ 701/19; 701/20; 701/2

(58) Field of Classification Search .............. 701/19–20, 701/2; 191/49–50; 246/1 R, 20–22, 218–221, 246/2 R; 105/1.4, 26.05, 96–96.2
See application file for complete search history.

(56) References Cited

U.S. PATENT DOCUMENTS

| | | | |
|---|---|---|---|
| 4,156,971 A | 6/1979 | Currie et al. | |
| 4,973,219 A * | 11/1990 | Brickner et al. | 414/792.9 |
| 7,302,319 B2 * | 11/2007 | Wu | 701/19 |
| 2005/0010338 A1 * | 1/2005 | Kraeling et al. | 701/19 |
| 2005/0273218 A1 * | 12/2005 | Breed et al. | 701/2 |
| 2006/0235609 A1 | 10/2006 | Makela et al. | |
| 2007/0150130 A1 * | 6/2007 | Welles et al. | 701/19 |
| 2008/0000381 A1 | 1/2008 | Bartley et al. | |

OTHER PUBLICATIONS

International Preliminary Report on Patentability for International (PCT) Application No. PCT/IB09/07306, mailed Apr. 28, 2011.
Official Action for Canada Patent Application No. 2,741,315, dated Jun. 6, 2012 2 pages.
International Search Report for International (PCT) Application No. PCT/IB09/07306, mailed Mar. 11, 2010.
Written Opinion for International (PCT) Application No. PCT/IB09/07306, mailed Mar. 11, 2010.
Background of the invention for the above-captioned invention filed Oct. 19, 2009.

* cited by examiner

*Primary Examiner* — Yonel Beaulieu
(74) *Attorney, Agent, or Firm* — Sheridan Ross PC

(57) ABSTRACT

A rail-based system is disclosed for moving materials and is applicable to a number of industries. The invention describes a system of automated self-powered rail cars operating independently to transport material such as ore from a work face in a mine or cargo from a marine port to a major transportation hub.

26 Claims, 15 Drawing Sheets

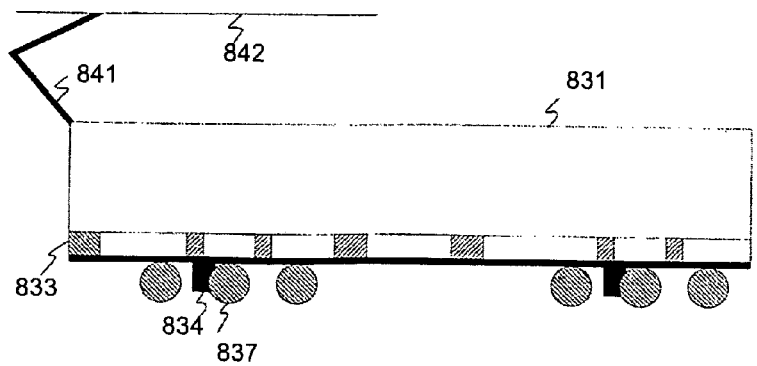
Fig. 8c
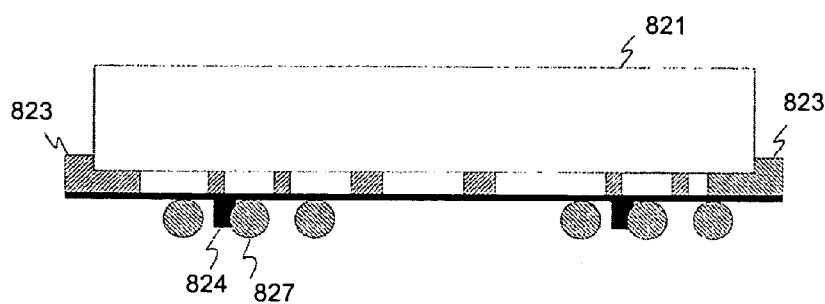
Fig. 8b
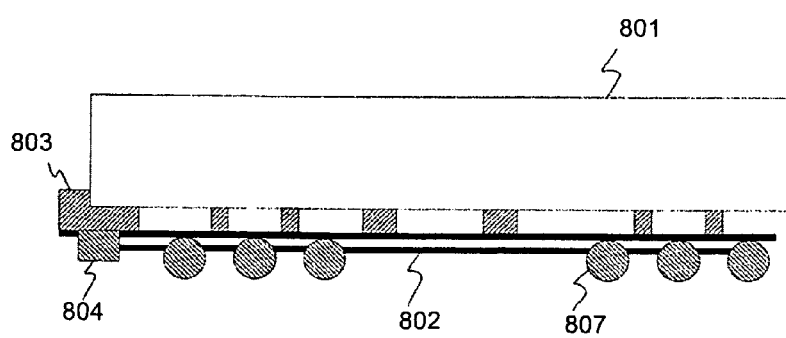
Fig. 8a
Figure 8

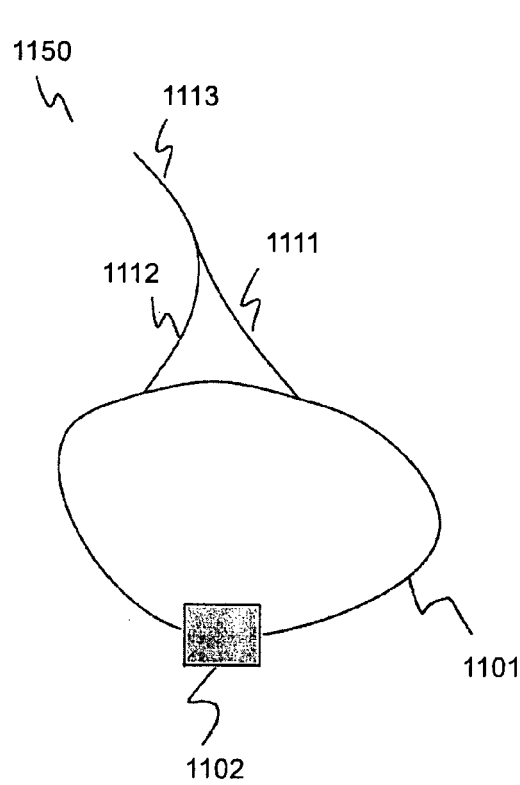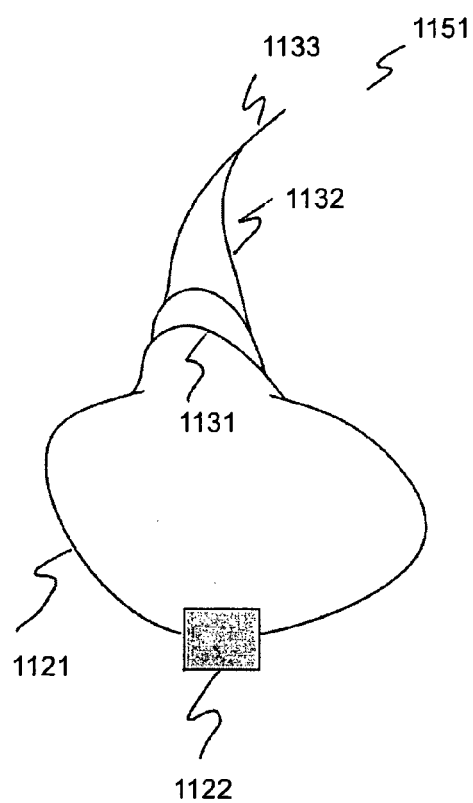
Fig. 11a  Fig. 11b
Figure 11

RAIL CONVEYANCE SYSTEM FOR MINING

CROSS REFERENCE TO RELATED APPLICATION

The present application claims the benefits, under 35 U.S.C. §119(e), of U.S. Provisional Application Ser. No. 61/106,340 entitled "Rail Conveyance System for Mining", filed Oct. 17, 2008 which is incorporated herein by this reference.

FIELD

The present invention relates to a rail-based system for moving materials and in particular relates to a rail-based system comprised of automated self-powered rail cars operating independently to transport material such as ore from a work face in a mine to a processing plant or cargo from a dock to a major transportation hub.

BACKGROUND

Moving bulk materials from a point of origin to a final destination over short distances, typically a few miles to up to about a hundred miles, can be expensive. Bulk materials can be moved these distances by truck, rail, conveyor system, pipeline or the like. The problem can be made more difficult when the point of origin or final destination moves as the case, for example, of an advancing work face in a mine.

Some of the problems of moving bulk materials are illustrated by examples from the mining industry. Materials including ore are moved around in mining operations by a number of means including:

trucks
conveyor systems
slurry pipelines
rail transport

Trucks have an advantage that they can go anywhere a road can be built. However, trucks, especially large mining trucks, are expensive to purchase and operate, and they usually require a driver. There are some mines that have automated trucks wherein the operator controls the truck from a remote location. Nevertheless, large mining trucks also require specialty tires and fuel, both which can be expensive.

Conveyor systems have advantages in certain mining situations where the ore and environmental situations are favorable. A major drawback of conveyor systems is that the ore or waste rock usually must be crushed. In other situations, conveyor systems can be maintenance intensive and can cause serious delays in production when they are shut down for repair. For example, ore in oil sands surface mines can be like hard rock in the winter and sticky asphalt in the hot summer months, making conveyor maintenance expensive in both seasons. Also if a section of conveyor breaks down, the whole conveyor line must be shut down until the section is repaired. Conveyor systems in underground mines can be particularly costly to maintain and repair because of the close quarters typical of most underground operations.

Slurry transport systems are suitable for ores that can be formed into a slurry. A major drawback of slurry systems is that the ore or waste rock usually must be crushed. These systems, also called hydro-transport systems, are often used in conjunction with another transport system since the slurry cannot usually be formed at or near the working face. Slurry systems are often used where transport distances are large and fixed such as for example from a slurry plant on a mine site to a remote processing plant.

Rail systems have an advantage that they are a highly fuel efficient system because of low rolling resistance. The have a disadvantage that tracks must be laid and are relatively difficult to move, for example when the mining face moves in an open pit operation. Rail systems typically involve one or more locomotives pulling or pushing a number of unpowered bulk material carrier cars. In this configuration, a disadvantage of mining rail systems is that they are limited by track adhesion considerations to grades in the range of about 3 degrees to about 7 degrees.

Small load carrying, self-powered transfer rail cars are known. The Atlas Car & Mfg. Co. of Cleveland Ohio makes electric transfer cars for steel plants, ore processing refineries and other applications. The General Electric Company has manufactured small load carrying locomotives (10 ton load capacity) in the early 1900s. Small battery powered load carrying locomotives (5 ton load capacity) have been manufactured for the explosives industry. None of these has been automated nor have they utilized multiple propulsion sources (internal combustion engines, energy storage and grid power).

There remains a need for a high capacity materials conveyance system that has: low fuel costs; low maintenance costs; flexibility to change its routing structure; and ability to negotiate steep grades of 10 degrees or more.

SUMMARY

These and other needs are addressed by the present invention.

In one embodiment, a rail car is provided that includes:
(a) a structure for carrying cargo;
(b) a plurality of truck assemblies, each truck assembly comprising one or more axles;
(c) an on-board power source to provide propulsion power to one or more of the axles; and
(d) a control interface operable to receive and process commands, to execute selected functions, the selected functions comprising a plurality of start, brake, speed setting, gear setting, power source activation, power source deactivation, load cargo, and unload cargo, wherein the commands are received from a remotely located operator or computer and/or from an on-board processor executing automation logic.

In another embodiment, a method is provided that includes the steps of:
(a) providing a haulage railway, the railway having at least one loading point and at least one unloading point;
(b) providing a plurality of rail cars traversing the haulage railway, each of the rail cars comprising:
(B1) a structure for carrying cargo;
(B2) a plurality of truck assemblies, each truck assembly comprising one or more axles;
(B3) an on board power source to provide propulsive power to at least one of the axles; and
(B4) a control interface operable to receive and process commands, to execute selected functions, the selected functions comprising a plurality of start, brake, speed setting, gear setting, power source activation, power source deactivation, load cargo, and unload cargo, wherein the commands are received from a remotely located operator and/or from an on board processor executing automation logic; and
(c) loading each rail car with cargo at the at least one loading point and unloading, from each rail car, the cargo at the at least one unloading point.

In yet another embodiment, a system is provided that includes:

(a) a railway having at least one controllable rail element;

(b) one or more self-propelled rail cars on the railway, each of the self-propelled rail cars comprising a cargo carrying structure, at least one driver axle, a transceiver, and a control interface, the control interface being operable to control selected operations of the respective rail car; and (c) a central controller operable to:

(C1) receive, from the a selected rail car a current spatial location of the selected rail car;

(C2) identify a controllable rail element in a path of travel of the selected rail car;

(C3) determine whether the selected rail car is loaded or unloaded; and (C4) in response, provide a command to the controllable rail element prior to arrival of the selected rail car.

In applications of one or more of the above embodiments, a number of automated self-powered cargo carrying rail cars are operated on a track conveyance system that can also be controlled remotely by either manual or automated means or by a combination of the two. Thus, the rail conveyance system can be partially or fully automated. The rail cars are individually operable by any of several propulsion means including an on-board engine or engines, an energy storage system such as for example a battery pack or by an outside source of power such as an overhead wire or an electrified third rail. For example, the rail car can be configured as a serial or parallel hybrid and may have regenerative braking. Each car includes two or more truck assembles. Each truck assembly may include one or more axles. Preferably, at least one axle on each car is powered, more preferably most of the axles are powered, and even more preferably all the axles are powered. The principal reason for powering at least one and most preferably all of the axles is to provide maximum tractive force so that the cars are capable of ascending grades without wheel slippage in the range of preferably at least about 10 degrees, more preferably at least about 12.5 degrees and most preferably at least about 15 degrees. This is a benefit especially for application in open pit or underground mines where a rail-based haulage system capable of ascending steep grades offers several advantages over a truck-based or conveyor-based haulage system. It is preferable that the self-powered cargo carrying rail cars or the burden cars of the present invention have a ratio of driver (sometimes referred to as driven) axles to total axles of at least about 0.167, more preferably a ratio of at least about 0.5 and most preferably a ratio of about 1.

The present invention also uses a combination of permanent track sections and sections of track formed by panel track which can be laid down quickly and reconfigured as needed. This capability is an advantage for example when a terminus served by the system is constantly changing, such as, for example, an advancing mine face. The automated self-powered cargo carrying rail cars are controlled remotely by any number of remote control telemetry techniques, such as for example, a belt controller unit worn by the operator, a wireless unit such as a computer or cellular phone, an optical link or any other commonly known means of communication. The operator may also have a video linkage to the rail car such as for example by cameras located on the rail car but in communication with the remote location where the operator is situated. In another configuration, the automated self-powered cargo carrying rail cars can be operated in fully automated mode under the partial or full direction of a computer program. Such operation is preferred in operations that are repetitive and/or in dangerous areas such as radioactive mining or waste storage.

In areas where there are both road and rail right-of-ways with frequent crossings, railroad crossings are required and are typically controlled by automatic equipment that is expensive to install and maintain. Automatic controlled railroad crossings often fail because of component breakdown and human behavior. A solution to a railroad crossing is "grade separation" wherein the rail right-of-way traverses a road crossing via a short overpass or underpass. This solution is cost effective if the rail vehicle can safely ascend and descend relatively steep grades or inclines, typically those greater than about 10 degrees. This can be a beneficial advantage for a rail conveyance system in situations where the road infrastructure is already established and the rail infrastructure is added later.

As can be appreciated, burden cars of the present invention can be operated individually or connected together to form short trains which would retain the high ratio of driver axles to total axles typical of each individual car.

The following definitions are used herein:

Adhesion is a measure of the resistance of friction to slippage between two parallel planes. In the case of a locomotive rail wheel, the parallel plane is the point on the steel rail wheel where the rail wheel contacts the steel rail. The maximum force or pull that a locomotive can generate in order to pull a train is limited by the weight of the locomotive and the amount of adhesion that it can maintain without wheel slippage. Adhesion is the maximum tangential force produced by a driving wheel before slipping given by:

$$F\max = (\text{coefficient of friction}) \times (\text{weight on wheel}) \times (\text{acceleration due to gravity})$$

The automatic brake is typically the pneumatic brake system for a train and usually includes the locomotive's pneumatic brake system.

A blended brake system is a combination of brake systems such as the combination of the dynamic and independent brakes on a locomotive or the dynamic and automatic brake systems on a train.

A burden car is a single car that carries cargo and provides its own propulsion.

A driver (or driven) axle is a rotating axle that transmits power from the propulsion system to the rails. A driver may refer to an axle or a wheel.

Dynamic braking is typically implemented when the electric propulsion motors are switched to generator mode during braking to augment the braking force. The electrical energy generated is typically dissipated in a resistance grid system. Dynamic braking can also be accomplished using pneumatics or hydraulics.

An energy storage system refers to any apparatus that acquires, stores and distributes mechanical or electrical energy which is produced from another energy source such as a prime energy source, a regenerative braking system, a third rail and an overhead wire and any external source of electrical energy. Examples are a battery pack, a bank of capacitors, a compressed air storage system and a bank of flywheels.

An engine refers to any device that uses energy to develop mechanical power, such as motion in some other machine. Examples are diesel engines, gas turbine engines, microturbines, Stirling engines and spark ignition engines A hopper car is a rail car for transporting bulk material. It is loaded through the top of its open cargo box and unloaded through chutes along the bottom of the car when the chute doors are opened.

An idler axle is a rotating axle that is not powered. An idler may refer to an axle or a wheel.

The independent brake is typically the pneumatic brake system on a locomotive.

A magnetic brake exerts its braking force by friction with the rail which generates heat in the magnetic brake pad and rail. Another form of magnetic brake is a linear or circular eddy current brake. These brakes slow an object by creating eddy currents through electromagnetic induction which create resistance. In an eddy current brake, the magnetic brake pad does not touch the rail but is held at a constant small distance from the rail (approximately 7 millimeters).

A prime power source refers to any device that uses energy to develop mechanical or electrical power, such as motion in some other machine. Examples are diesel engines, gas turbine engines, microturbines, Stirling engines, spark ignition engines or fuel cells.

A side dumping car is a rail car for transporting bulk material. It is loaded through the top of its open cargo box and is unloaded by utilizing cylinders to tilt the box to dump its cargo.

A traction motor is a motor used primarily for propulsion such as commonly used in a locomotive. Examples are an AC or DC induction motor, a permanent magnet motor and a switched reluctance motor.

Tractive effort is the force applied by the driving wheels parallel to the track. Tractive effort is a synonym of tractive force, typically used in railway engineering terminology when describing the pulling power of a locomotive. The tractive effort provided by a particular locomotive varies depending on speed and track conditions, and is influenced by a number of other factors.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIGS. 8a-c are schematics of self-powered modes for rail cars.

FIGS. 11a-b are schematics of an alternate track system suitable for a moving loading point.

DETAILED DESCRIPTION

Figure 1:
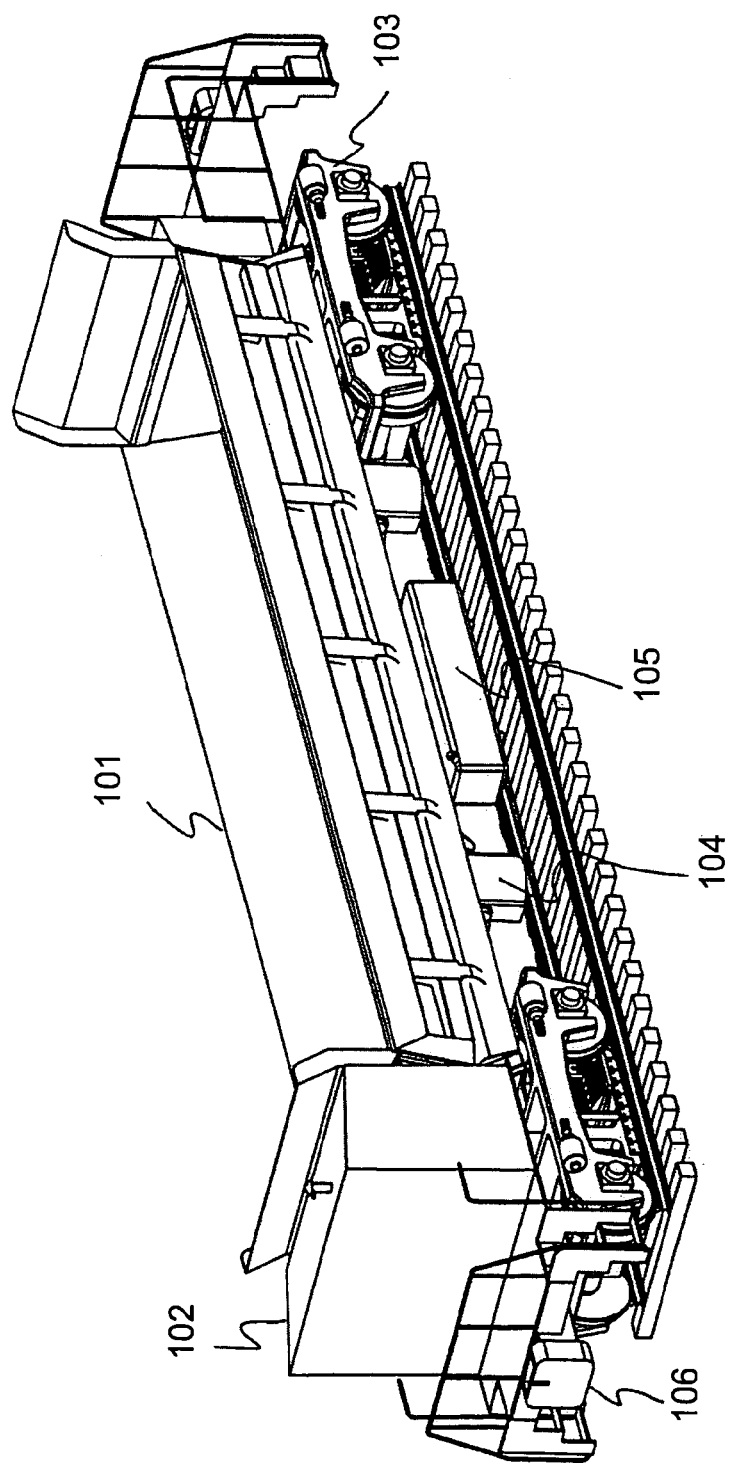
FIG. 1 is an isometric schematic view of an automated side dumping car according to an embodiment of the present invention.

A train may be comprised of a locomotive and a number of passive rail cars. For example a train may be comprised of one locomotive and about 30 passive rail cars. As another example, a train may be comprised of five locomotives and about 130 passive rail cars. The axles that provide propulsive power are called drivers and the axles that do not provide any propulsive power are called idlers. By way of illustration, consider the above examples where each locomotive has 6 powered axles and 2 unpowered axles, and each passive rail car has 4 unpowered axles. The single locomotive train would have a total of 128 axles, 6 of which are drivers and 122 of which are idlers. The ratio of driver axles to total axles would be 6/128=0.0469. The five locomotive train would have a total of 560 axles, 30 of which are drivers and 530 of which are idlers. The ratio of driver axles to total axles would be 30/560=0.0536. The maximum grade that these trains can ascend is typically in the range of about 3 degrees to about 7 degrees.

Now consider a single burden car which is a rail car that has its own propulsion and carries substantial cargo. If this burden car has 6 axles, 1 of which is powered, then the ratio of driver axles to total axles would be 1/6=0.167. If this burden car has 6 axles, all of which are powered then the ratio of drivers to total axles would be 6/6=1.0. The maximum grade that a burden car can ascend is typically in the range of about 10 degrees to about 15 degrees.

The ratio of driver axles to total axles is thus a measure of grade climbing capability in rail conveyance. A higher ratio of driver axles to total axles indicates a higher grade climbing capability. A high ratio of driver axles to total axles leads to an advantage which is the ability to implement low cost grade separation in areas where there are both road and rail right-of-ways with frequent crossings.

Railroad crossings are typically controlled by automatic gates, arms, flashing lights, and bells and are expensive to install and maintain. Automatic controlled railroad crossing are often fail because of component breakdown and human behavior. Even when automatic railroad crossing are respected and function properly, they can impede the flow of traffic, which can be troublesome when emergence vehicles are blocked or road traffic volume is heavy.

A solution to a railroad crossing is "grade separation" wherein the rail right-of-way traverses a road crossing via a short overpass or underpass. This solution is cost effective if the rail vehicle can safely ascend and descend relatively steep grades or inclines, typically those greater than about 10 degrees. This can be an advantage for a rail conveyance system in situations where the road infrastructure is already established and the rail infrastructure is added later.

As can be appreciated, burden cars can be operated individually or connected together to form short trains which would retain the high ratio of driver axles to total axles typical of each individual car.

Components of the Present Invention

FIG. 1 is an isometric schematic view of an automated self-powered side dumping car according to an embodiment of the present invention. A cargo box 101 is attached to a frame which, in turn, is mounted on two truck assemblies 103.

Figure 3:
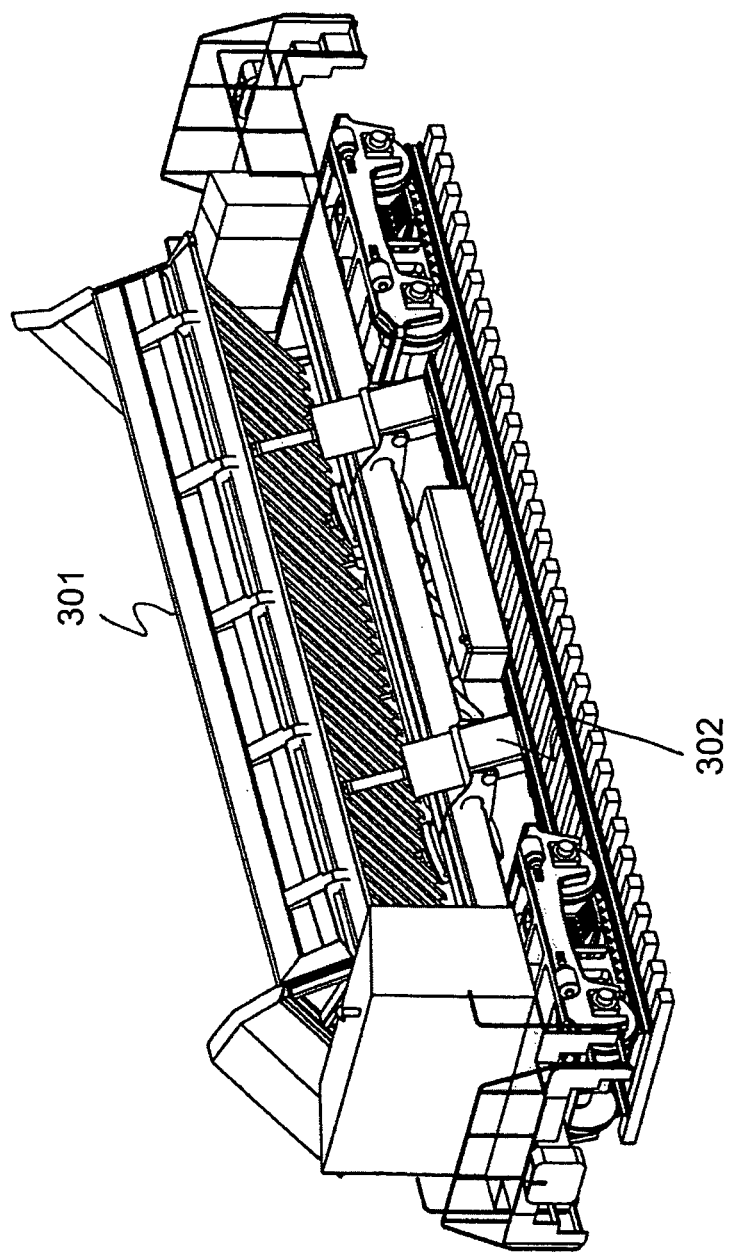
FIG. 3 is yet another isometric schematic view of an automated side dumping car of the present invention.

The cargo box 101 can be tilted for unloading by hydraulic or pneumatic cylinders 104 as shown further in FIG. 3. An engine or engines are located inside housing 102 and the engine or engines power one or both truck assemblies 103. A fuel tank 105 is also shown. The car has steel bumper/couplers 106 at either end. These allow cars to contact each other without damage and also allow cars to be coupled together using a steel plate coupling apparatus dropped into the slot on the steel bumpers 106. A side dumping car is loaded by depositing material such as ore into the top of the cars and is typically unloaded by tilting the body to one side as shown in FIG. 3. As part of the present invention, each side dumping car includes an engine or engines and a drive system to power the car's axles. Examples of motive power drive options are given in FIG. 8. The wheels of these cars are typically 33-inches in diameter. These wheels can be replaced, if desired, by locomotive wheels which are 40-inches in diameter so as to increase adhesion of the driving wheels to the rails. Preferably, all the axles of the self-powered side dumping car are powered so as to provide maximum traction to the rails for climbing steep grades in all types of weather. As can be appreciated, these cars can be lengthened and equipped with three or more trucks or the trucks may be one, two, three or four axle trucks.

Figure 2:
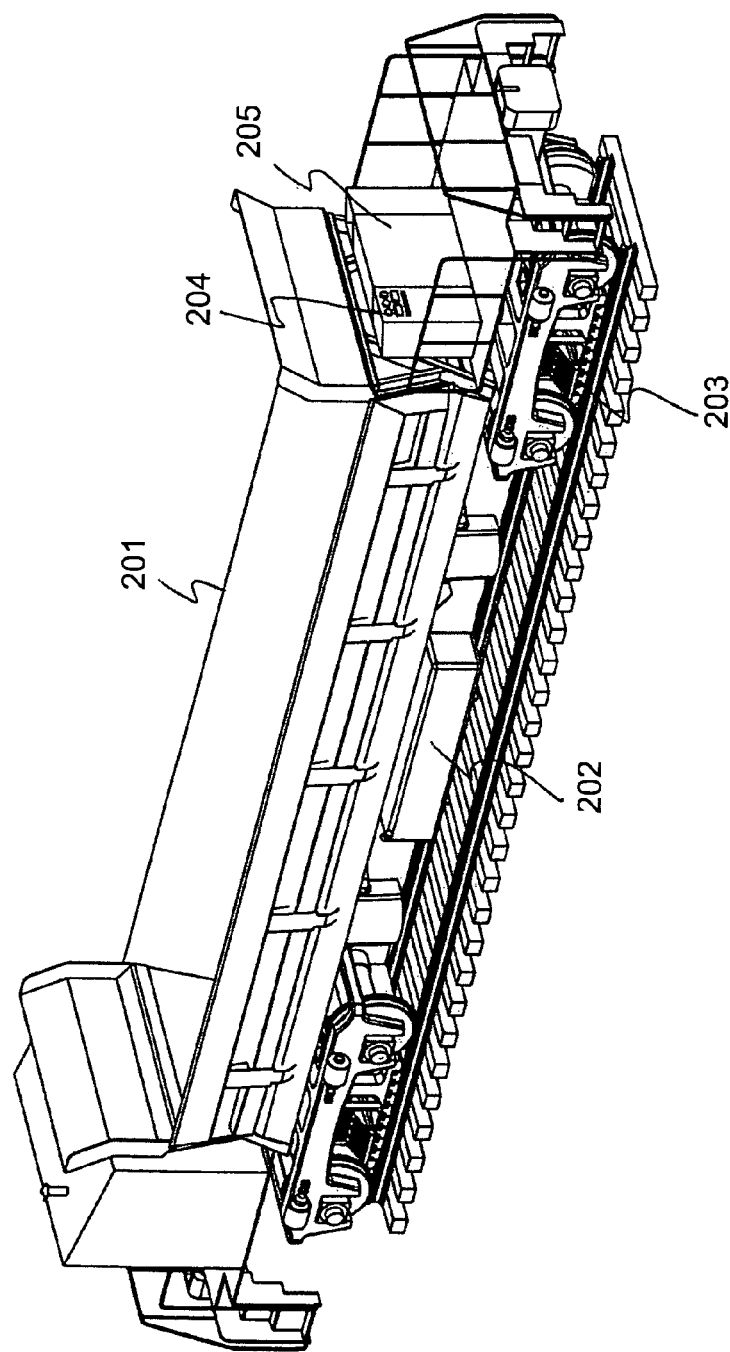
FIG. 2 is another isometric schematic view of an automated side dumping car of the present invention.

FIG. 2 is an alternate isometric schematic view of the self-powered automated side dumping car of FIG. 1. A cargo box 201 is attached to a frame which, in turn, is mounted on two truck assemblies. This view shows a dynamic brake apparatus in cabinet 205 and a separate cabinet 204 for power and control electronics as well as for communications apparatus. This view also shows a magnetic brake assembly 203, one for each of the two truck assemblies. Also shown is a fuel tank 202.

FIG. 3 is an isometric schematic view of an automated side dumping car with the cargo box 301 tilted for unloading. The cargo box 301 is tilted by hydraulic or pneumatic cylinders 302. Passive versions of these type of side dumping cars are made, for example, by JK-CO., LLC of Findlay Ohio.

Figure 4:
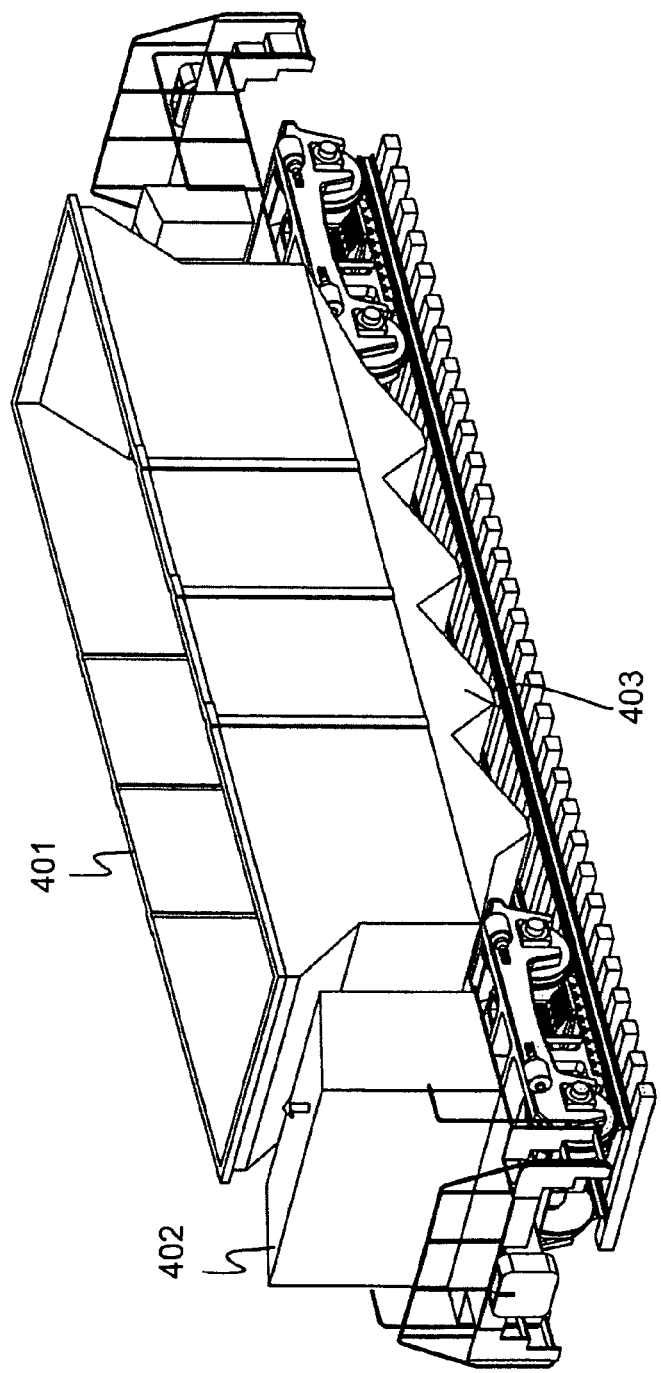
FIG. 4 is an isometric schematic view of an automated hopper car according to another embodiment of the present invention.

FIG. 4 is an isometric schematic view of an automated hopper car according to another embodiment of the present invention. A cargo box 401 is shown mounted on two truck assemblies similar to those of the side dumping car of FIG. 1. One or both truck assemblies may be powered by an engine or engines located inside housing 402. A hopper cars is loaded by depositing material such as ore into the top of the cars and is unloaded by dropping the material through the bottom by opening hopper doors 403.

Figure 5:
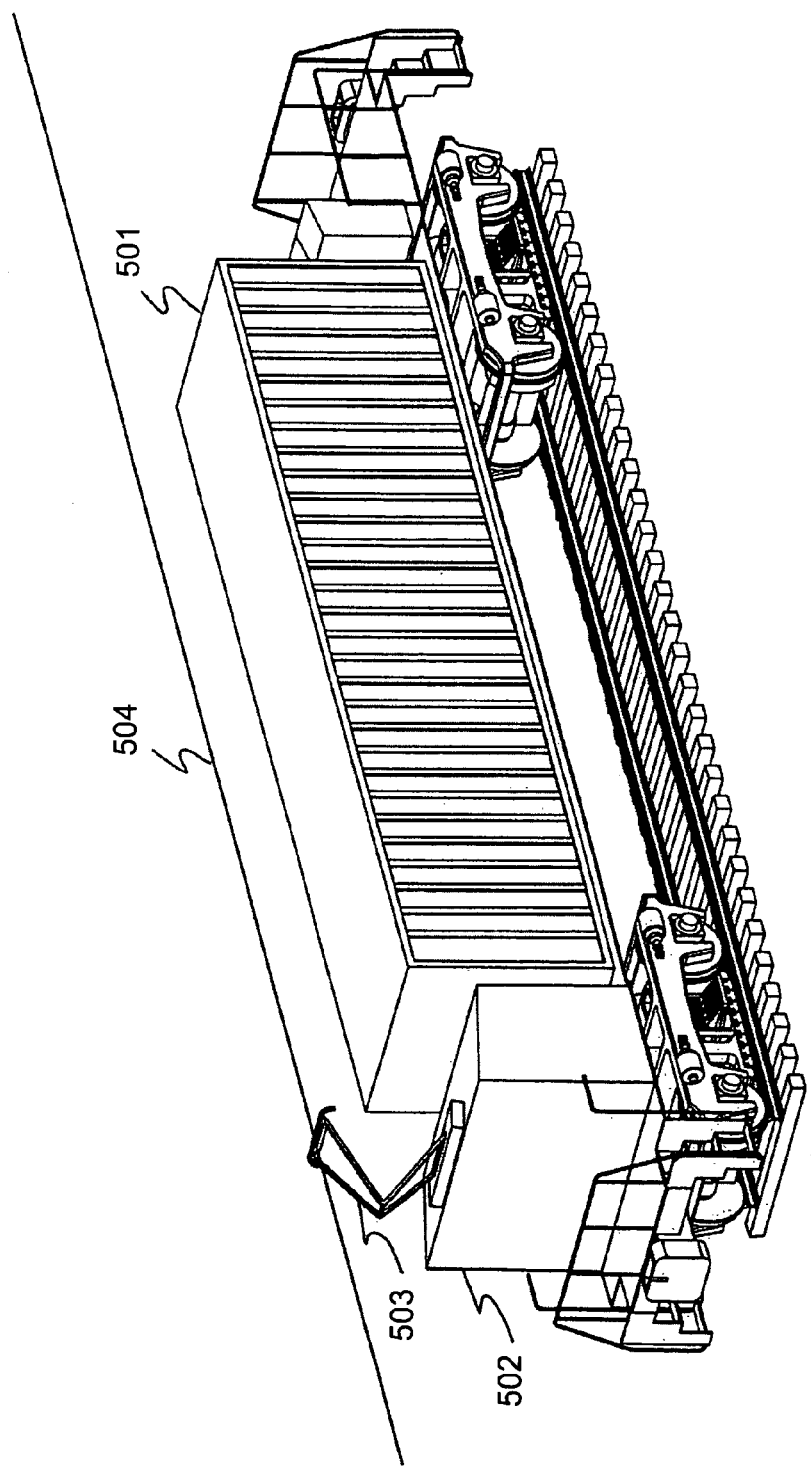
FIG. 5 is an isometric schematic view of an automated cargo container car according to yet another embodiment of the present invention.

FIG. 5 is an isometric schematic view of a self-powered automated cargo container car according to yet another embodiment of the present invention. This car is similar to that of FIGS. 1 through 4 except that it has no cargo box but has a flat deck on which a cargo container 501 can be positioned and secured. The container car is also shown with a pantograph electrical pickup 503 which allows the car to be powered by overhead electrified wires 504. On-board energy storage may be provided by battery pack 502.

As can be appreciated, the cars shown in FIGS. 1 through 5 can be powered by an engine or engines. They can be alternately operated by traction motors powered from an overhead wire or an electrified third rail. Any of the cars of FIGS. 1 through 5 can be powered by a combination of engines, overhead wire, third rail or battery packs. In the case of battery packs, these may be charged from time to time by the engines, overhead wire or third rail by well-known techniques. The addition of a battery pack allows the cars to run for short periods with the engines shut off or when there is no available overhead wire or third rail power available.

It is noted that in the context of the present invention, that operating with zero emissions means operating with zero emissions in the region in which the rail system operates. For example, this can be in a mine, in a port region or in an entire urban basin. Operating with zero emissions means operating from an energy storage system such as a battery pack or obtaining power from the power grid via an overhead wire or a third rail. The power obtained from a power grid is considered zero emission when the grid power generating facility is located remotely from the region in which the rail system of the present invention is operating. These remotely sited grid power generating facilities may be nuclear power plants or they may be fired by coal, natural gas and the like. Any emissions generated by the remotely located power plant are not counted as emissions in the region in which the rail system of the present invention is operating.

Figure 6:
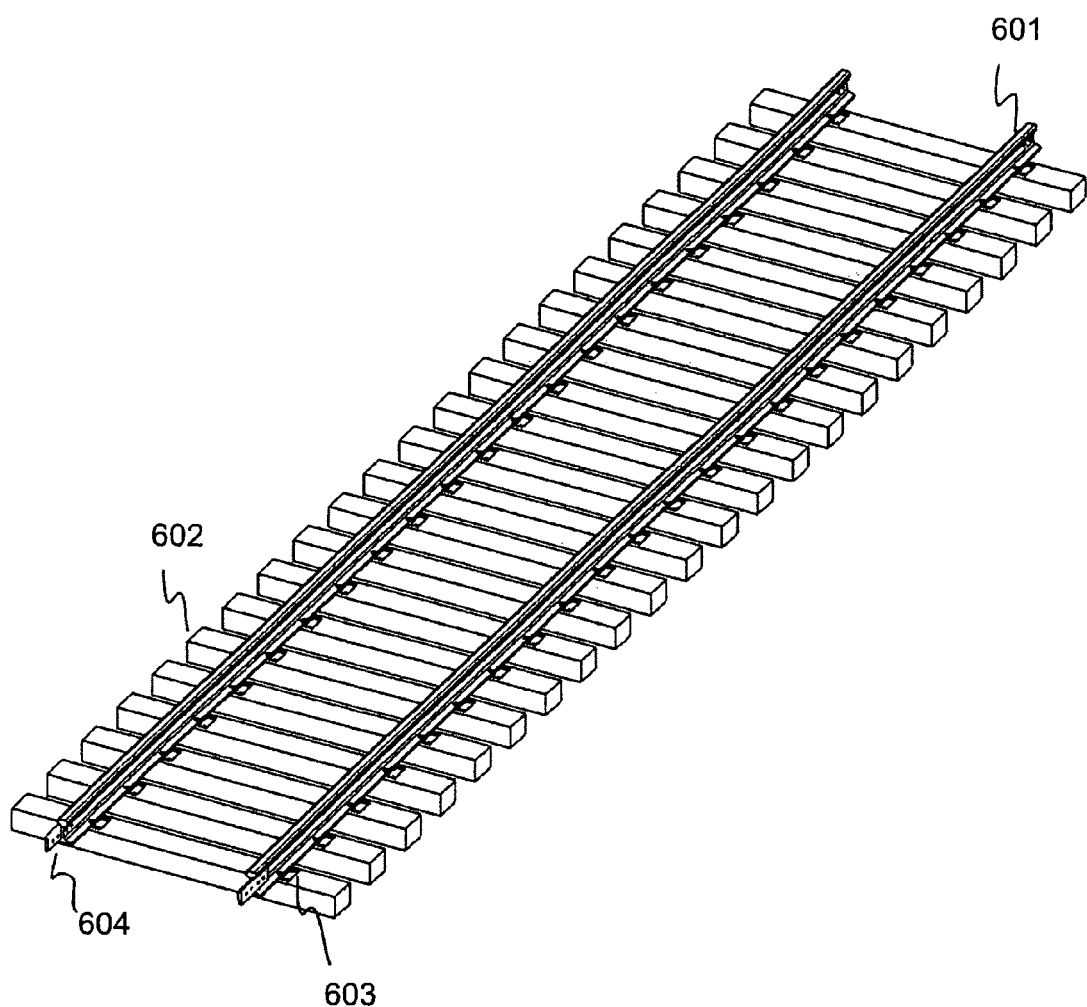
FIG. 6 is an isometric schematic view of a section of panel track which is prior art.

FIG. 6 is an isometric schematic view of a section of panel track which is prior art. This is a section of pre-fabricated track comprised of rails 601, ties 602 and tie-down spikes 603. The ends of each rail 601 have splicing bars 604 that allow track panels to be assembled into a track of any length. As can be appreciated, the sections of panel track may be curved either as right or left handed sections. As can be further appreciated, a track system for a any transport operation can be constructed using well-known track laying techniques. However, panel track (prefabricated sections of track) is preferable for many applications of the present invention as it allows more flexibility for laying and re-routing track quickly. Such panel track may be maneuvered into position by, for example self-powered cranes, backhoes, front end loaders and the like. Panel track can be installed on a standard road bed of gravel or a flat graded surface. Alternately, panel track can easily be installed on road beds comprised of plywood laid on a gravel bed which may be preferable for areas of poor ground. This latter option may be used since the cars of the present invention travel individually thus not placing a load along a length of track longer than a single car. Panel track is most suited to many mining applications since the mine layout is always changing as the working face or faces are advanced. Permanent track layouts may be preferable for applications in, for example, ports where cargo is moved repetitively from known locations to other known locations.

Figure 7:
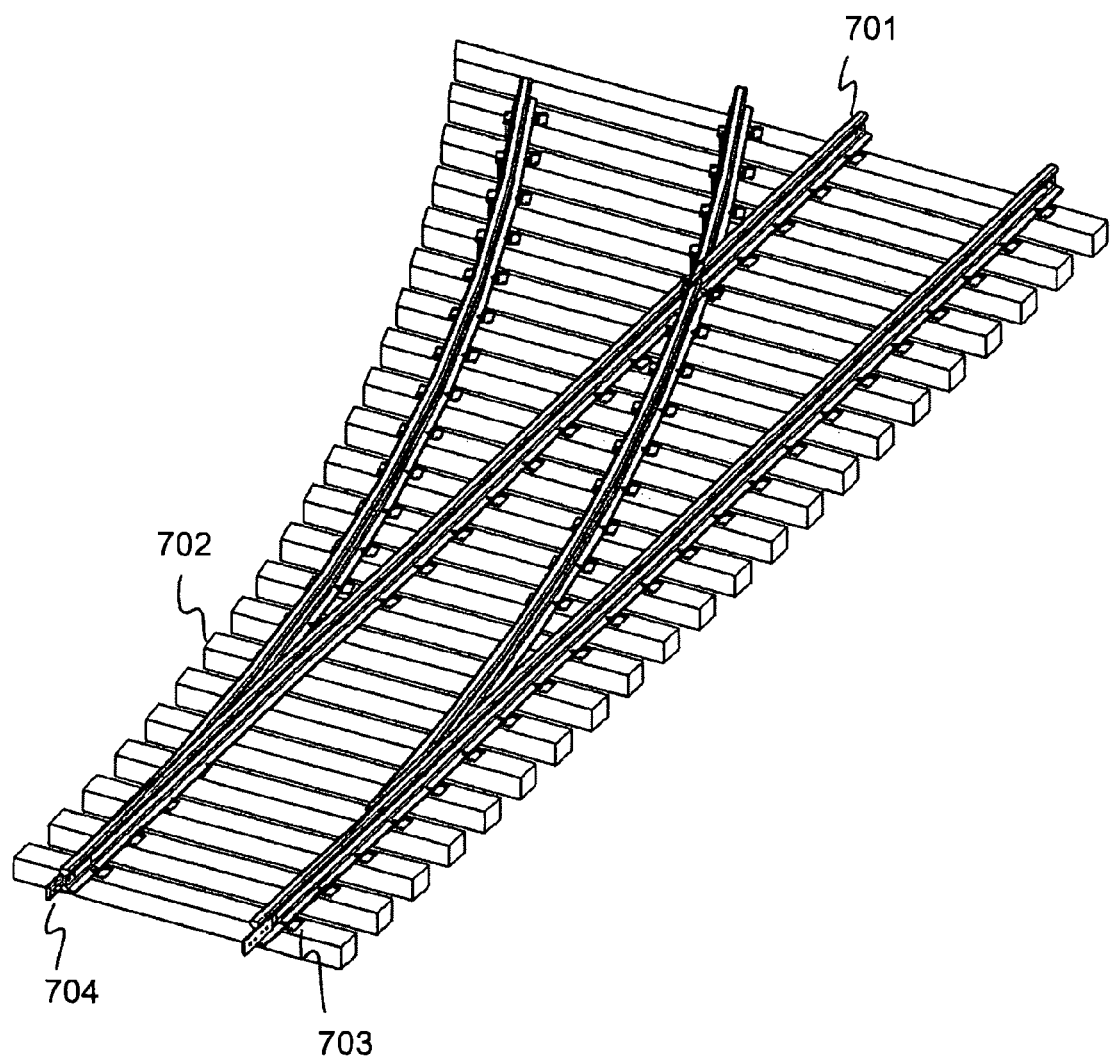
FIG. 7 is an isometric schematic view of a section of switched panel track which is prior art.

FIG. 7 is an isometric schematic view of a section of switched panel track which is prior art. This is a section of pre-fabricated track comprised of rails 701, ties 702 and tie-down spikes 703. The ends of each rail 701 have splicing bars 704 that allow track panels to be assembled into a track layouts of any configuration and length. Panel track typically has the joints at the end of each section directly opposite each other. It is sometimes preferable to not have joints directly opposite each other. If desired, panel track sections can be fabricated with one rail shorter on both ends such that a separate short section can be installed to keep the rail joints from being located directly opposite each other. The articulated switch can be manually but preferably operated remotely by the system operator.

Fabrication of Self-Powered Rail Cars

It is also noted that the cars of the various embodiments of the present invention can be custom built or they can be fabricated by utilizing new or used locomotive trucks. There are a number of sources of used locomotive trucks in North America that could be applied to the self powered railcars. It is preferable to utilize used trucks from scrapped locomotives. It is preferable to use 2 axle or 3 axle trucks are suitable for either AC or DC traction motors. DC traction motors are more preferable since used DC traction motors are more plentiful; DC motors will run directly from a DC source; and DC motors do not require as many expensive power electronic components such as inverters. AC motors are much more difficult to operate because of the needed, extra costly hardware. A significant consideration in the selection of locomotive trucks types is the choice of 2 axle or 3 axle trucks. The 3 axle truck can support 50% more weight than its 2 axle counterpart but there are other factors that need to be considered. One of the more important issues in designing a rail conveyance system is track curvature. A 2 axle truck can negotiate tighter turns than a 3 axle truck. A final consideration for system design is axle loading. For a given gross rail car weight, a 3 axle truck will have lower axle loading than 2 axle truck and can run on lighter rails and structures but the 3 axle truck has a higher tare weight which impacts energy efficiency. The actual design of the rail conveyance system is a blended process, that must take into account performance criteria, modifying the existing design of a rail car, locating sources for usable locomotive trucks and selecting and integrating all of the ancillary parts to make the system work.

Modes of Operation

The present invention is based on the use of self-powered rail cars that have at least one and preferably more than one powered axles. The rail cars are for the most part controlled remotely although they can also be controlled by an operator located on or off the car, controlling the car utilizing a portable controller. In the example of a mine, the track system is typically comprised of a permanent section that connects an ore transfer station to the environs of the working face. The track system may be extended by temporary spurs to follow one or more working faces as overburden and/or ore is excavated by any number of excavators such as for example power shovels, draglines, backhoes, bucket wheels and the like. The present invention may also include a tracked or multi-wheel transporter to ferry ore from the excavator to the end of the nearest track spur. Such a vehicle may transport ore or may transport the self-powered rail car itself.

The advantages of the self-powered rail system of the present invention are:
  low capital cost rail cars
  low rolling friction resulting in reduced fuel costs
  in a mine, can carry overburden, waste and ore without need to crush oversize
  can transport material up steeper grades (grade angles of up to about 10 to 15 degrees)
  flexibility to follow an advancing working face by laying standard track or panel track
  in a port, can carry containerized cargo to nearby railheads or truck hubs
  reduced track bed bearing capacity requirements since rail sections are traversed by single cars
  can operate on engine power or when required to operate without emissions, can run on battery power or power from the power grid using either an overhead wire or a third rail.

FIG. 8 a schematic of self-powered modes for rail cars. FIG. 8a shows a cargo box 801 of a rail car which, in this embodiment, has side dumping pistons 806 connecting the cargo box 801 with the frame of the rail car. In this configuration, an engine 803 is shown connected to a mechanical gear box 804 which, in turn, is connected to a cardon shaft 802. The cardon shaft is connected to some or all of the axles to provide power to these axles. It is preferable that the cardon shaft be connected to at least two axles and more preferable that the cardon shaft be connected to all axles to provide maximum adhesion especially for going up grades. FIG. 8a shows a side dumping rail car with 6 axles, some of which may be powered and the remaining which may not be powered. The side dumping car can have a carrying capacity in the range of approximately 20 tons to approximately 150 tons and may have a gross, fully loaded weight in the range of approximately 50 tons to approximately 220 tons.

The engine has a maximum brake horsepower ("HP") in the range of about 100 to about 600 HP. The self-powered side dumping rail car includes a fuel tank, such as a belly fuel tank (not shown). The engine 803 may be connected to the drive shaft 802 by means of a belt drive where the belt may be comprised of a material such as micro-groove polyester, micro-groove kevlar, micro-groove carbon fibre or the like.

FIG. 8b shows a cargo box 821 of a rail car which has side dumping pistons connecting cargo box 821 with the frame of the rail car. In this configuration, two engines 823 are shown, one mounted at each end of the car. Each engine drives a generator or alternator which in turn provides electrical power to traction motors 824 mounted on axles driving wheel sets 827. Alternately, the engines can drive hydraulic pumps which can power hydraulic traction motors that drive the wheels. As can be appreciated, each engine can power one, two or more traction motors on the truck assemblies at each end of the car. It is preferable that the car have at least two traction motors connected to at least two axles and more preferable that the car have traction motors connected to at all axles to provide additional adhesion especially for going up steep grades. FIG. 8b shows a side dumping rail car with 6 axles, some or all of which may be powered. The car can have a carrying capacity in the range of approximately 20 tons to approximately 150 tons and may have a gross, fully loaded weight in the range of approximately 50 tons to approximately 220 tons.

Each of the two engines have a maximum brake horsepower ("HP") in the range of about 100 to about 600 HP. The self-powered side dump rail car includes a fuel tank, such as a belly fuel tank, which is not shown. Control of the dump rail cars is the same as described for the dump car of FIG. 8a.

FIG. 8c is a schematic of a side dumping rail car powered by an overhead wire. FIG. 8c shows a cargo body 831 of a car which has side dumping pistons connecting the dump body 831 with the frame of the rail car. In this configuration, two traction motors 834 are shown, one mounted on a truck assembly at each end of the dump car. The traction motors are operated by power provided by a pantograph 841 which slides in contact with overhead wires 842 that provide grid power. Alternately, electrical power may be obtained from a third rail. The voltage in the overhead power line or third rail is in the range of about 300 to about 1,500 volts and the electrical power provided by the overhead power line or third rail is in the range of about 75 kW to about 1,000 kW. As can be appreciated, each truck assembly can have one, two or three traction motors. It is preferable that the car have at least two traction motors connected to at least two axles and more preferable that the car have at traction motors connected to all axles to provide maximum adhesion especially for going up grades. FIG. 8c shows a side dumping rail car with 6 axles, some or all of which may be powered. The car can have a carrying capacity in the range of approximately 20 tons to approximately 150 tons and may have a gross, fully loaded weight in the range of approximately 50 tons to approximately 220 tons. The self-powered side dump rail car includes a fuel tank, such as a belly fuel tank (not shown). Control of the dump rail cars is the same as described for the dump car of FIG. 8a and FIG. 8b.

Ascending Steep Grades

Figure 9:
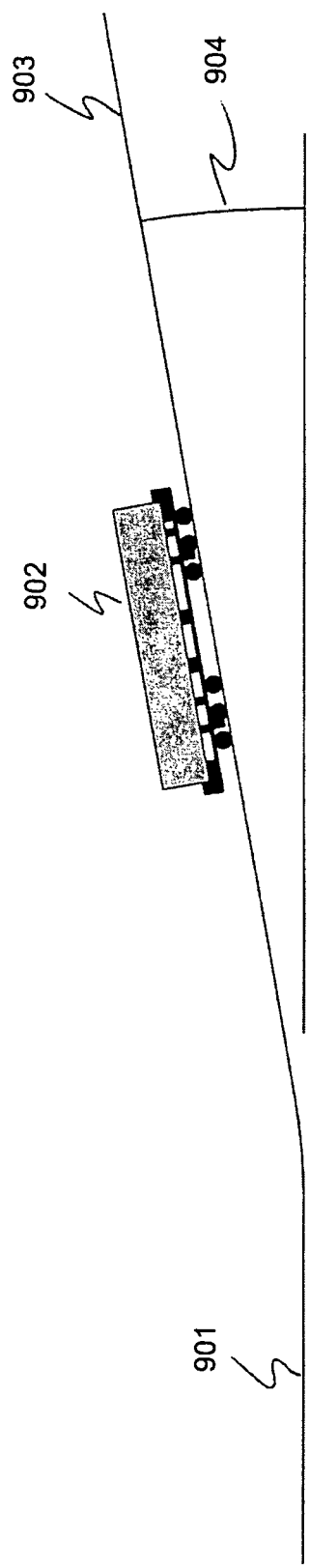
FIG. 9 is a schematic of a self-powered rail car on a grade.

FIG. 9 is a schematic of a self-powered rail car 902 on a grade 903 defined by an angle 904 with respect to a level section of track 901. For a rail car 902 weighing W lbs and having N axles on a grade of angle α, the weight per wheel normal to the track surface is:

$W \cos(\alpha)/(2N)$ lbs, where α is the grade angle 904 in radians.

If Np axles are powered, there are 2 Np powered wheels. The total tractive force required by the rail car to climb a grade of grade angle α is $W \sin(\alpha)$ lbs.

The required tractive force per powered wheel is then:

$W \sin(\alpha)/2 Np$ lbs.

Therefore the required adhesion coefficient is:

$[W \sin(\alpha)/2 Np]/[W \cos(\alpha)/(2N)]$ which is simplified to $\tan(\alpha) N/Np$.

As can be seen, the required adhesion coefficient for a rail car to climb a given grade depends only on the grade angle and the ratio of powered (driver) axles to total axles, and does not depend on the total weight of the rail car and its load.

The adhesion coefficient is defined as the tractive force per powered wheel parallel to the track divided by the weight per wheel normal to the track. It is known that an adhesion coefficient of about 0.20 is typical of wet track and an adhesion coefficient of about 0.35 is typical of dry track. As is well-known, sand can be applied to the rails to increase the adhesion coefficient.

A typical heavy rail axle is rated to carry 65,000 lbs although newer axles fabricated from higher grade steels are rated at about 70,000 lbs to about 75,000 lbs per axle.

As an example, consider a self-powered rail car having a total loaded weight of 400,000 lbs, 6 axles of which 2 are powered. The following table shows the required minimum adhesion coefficient as a function of grade angle.

| 6 Total Axles, 2 Powered Axles | |
|---|---|
| Grade Angle, α (degrees) | Required Minimum Adhesion Coefficient |
| 1 | 0.052 |
| 2 | 0.105 |
| 3 | 0.157 |
| 4 | 0.210 |
| 5 | 0.262 |
| 6 | 0.315 |
| 7 | 0.368 |
| 8 | 0.422 |
| 9 | 0.475 |
| 10 | 0.529 |
| 11 | 0.583 |
| 12 | 0.638 |
| 13 | 0.693 |
| 14 | 0.748 |

In this example, the self-powered rail car can climb about a 4 degree grade in wet conditions and about a 7 degree grade in dry conditions.

Now consider an example of a self-powered rail car having a total loaded weight of 400,000 lbs, 6 axles of which 4 are powered. The following table shows the required minimum adhesion coefficient as a function of grade angle.

| 6 Total Axles, 4 Powered Axles | |
|---|---|
| Grade Angle, α (degrees) | Required Adhesion Minimum Coefficient |
| 1 | 0.026 |
| 2 | 0.052 |
| 3 | 0.079 |
| 4 | 0.105 |
| 5 | 0.131 |
| 6 | 0.158 |
| 7 | 0.184 |
| 8 | 0.211 |
| 9 | 0.238 |
| 10 | 0.264 |
| 11 | 0.292 |
| 12 | 0.319 |
| 13 | 0.346 |
| 14 | 0.374 |

In this example, the self-powered rail car can climb about an 8 degree grade in wet conditions and about a 13 degree grade in dry conditions Now consider an example of a self-powered rail car having a total loaded weight of 400,000 lbs, 6 axles of which all 6 are powered. The following table shows the required minimum adhesion coefficient as a function of grade angle.

| 6 Total Axles, 6 Powered Axles | |
|---|---|
| Grade Angle, α (degrees) | Required Adhesion Minimum Coefficient |
| 1 | 0.017 |
| 2 | 0.035 |
| 3 | 0.052 |
| 4 | 0.070 |
| 5 | 0.087 |
| 6 | 0.105 |
| 7 | 0.123 |
| 8 | 0.141 |
| 9 | 0.158 |
| 10 | 0.176 |
| 11 | 0.194 |
| 12 | 0.213 |
| 13 | 0.231 |
| 14 | 0.249 |

In this example, the self-powered rail car can climb about a 12 degree grade in wet conditions and about a 20 degree grade in dry conditions.

Thus, a self-powered rail car can climb a substantially steeper grade than a train of several cars where the tractive effort of the train is provided only by locomotives and not by any of the cargo carrying cars.

It is also noted that the adhesion coefficient is typically higher at lower velocities so a self-powered rail car can climb a steep grade with greater safety margin when it is moving at about 20 to 25 mph or less. Also, it is noted that the adhesion coefficient is typically higher for wheels toward the rear of the rail car than for the forward wheels. This is because the forward wheels typically clear the rails of water, dirt etcetera. Therefore, it is preferable to power the axles toward the rear of the rail car rather than those toward the front of the rail car, when not all axles are powered.

Track Configurations

Figure 10:
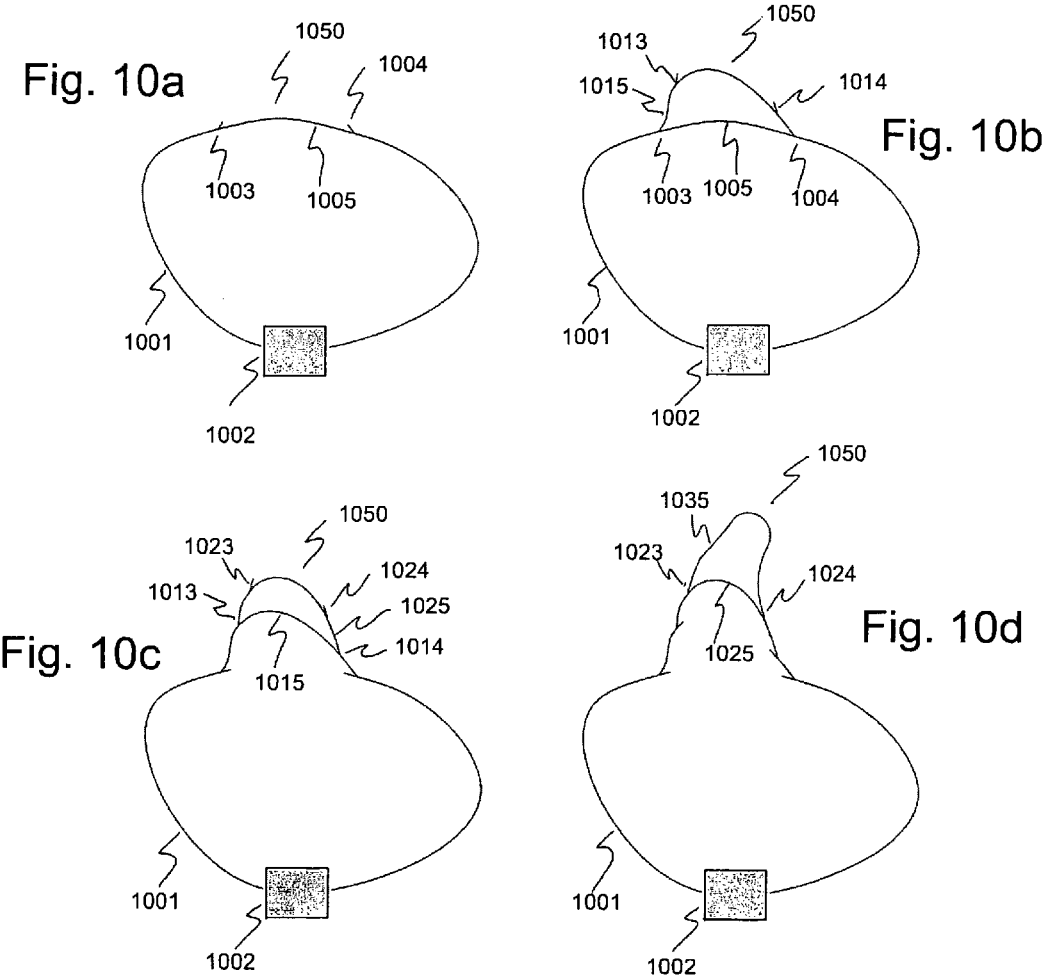
FIGS. 10a-d are schematics of a track system suitable for a moving loading point.

FIG. 10 is a schematic of a track system suitable for a moving loading point. As can be appreciated, this is an example and there are many other possible track configurations depending on the conveyance situation. FIG. 10 illustrates a possible track configuration as it is advanced for the example of a work face in a mine. FIG. 10a shows a permanent track 1001 that passes through an ore transfer station 1002 and also passes by a work face 1050. The self-powered rail car of the present invention stops at the work face and is loaded with ore. This may be accomplished for example by a power shovel, a load-haul dump unit or dragline which loads the rail car directly. Alternately, the rail car may be loaded by an intermediate means such as for example a conveyor or truck that shuttles back and forth between the excavator and the rail car. Alternately, the rail car may be loaded on a carrier vehicle and moved into position to be loaded by the excavator. Once the rail car is loaded it is moved along the track 1001 back to the ore transfer station where the ore is unloaded from the rail car. As can be seen, track switch sections 1003 and 1004 have been installed as part of permanent track 1001.

As the work face 1050 moves away from track 1001 (resulting from the excavator following the ore body as it is mined), an additional section of track 1015 may be added as shown in FIG. 10b by joining track section 1015 at switch sections 1003 and 1004. The additional track 1015 allows the self-powered rail car to stay close to the work face 1050 so that the rail car can be loaded with ore by whichever means is used. Once the rail car is loaded, it is moved along the track 1015 and 1001 back to the ore transfer station where the ore is unloaded from the rail car. As can be seen, track switch sections 1013 and 1014 have been installed as part of the added section of track 1015.

As the work face 1050 continues to move away from track 1015 (resulting from the excavator following the ore body as it is mined), an additional section of track 1025 may be added as shown in FIG. 10c by joining track section 1025 at switch sections 1013 and 1014. The additional track 1025 allows the self-powered rail car to stay close to the work face 1050 so that the rail car can be loaded with ore by whichever means is used. Once the rail car is loaded it is moved along the track 1025, 1015 and 1001 back to the ore transfer station where the ore is unloaded from the rail car. As can be seen, track switch sections 1023 and 1024 have been installed as part of the added section of track 1025. As can also be seen, track section 1005 (shown in FIG. 10b) may be removed as it is no longer required.

As the work face 1050 continues to move away from track 1025, an additional section of track 1035 may be added as shown in FIG. 10d by joining track section 1035 at switch sections 1023 and 1024. The additional track 1035 allows the self-powered rail car to stay close to the work face 1050 so that the rail car can be loaded with ore by whichever means is used. Once the rail car is loaded it is moved along the track 1035, 1025, 1015 and 1001 back to the ore transfer station where the ore is unloaded from the rail car. As can be seen, track section 1015 (shown in FIG. 10c) may be removed as it is no longer required.

In this way, track can be added so that the rail cars can remain close to the work face as the work face is moved as mining proceeds.

If the mine is an underground mine, the size of the self-powered cars may be smaller to fit the mine's standard drift and adit cross-sections. Rather than have a track system that self-powered rail cars can go around in a loop, an underground mine typically may require a track system in which cars going in opposite directions can pass. There are many well-known by-pass techniques to incorporate this capability into an underground mine transport system of the present invention.

FIG. 11 is a schematic of an alternate track system suitable for a moving loading point. Again using the example of a mine for illustration, FIG. 11a shows a permanent track 1101 that passes through an ore transfer station 1102 and also extends to a work face 1150. The self-powered rail car of the present invention switches to track 1111 and then onto spur 1113 in order to reach the work face where it is loaded with ore. The loaded car then returns along spur 1113 and switches to track 1112 for its return journey to ore transfer station 1102.

As the work face 1150 moves away from track 1101 (resulting from the excavator following the ore body as it is mined), the spur 1113 is lengthened, allowing the self-powered rail car to stay close to work face 1150 so that the rail car can be loaded with ore by whichever means is used. FIG. 11b illustrates how a track configuration can be moved by a combination of track extensions 1131 and a spur 1133 to keep up with an advancing work face 1151.

Figure 12:
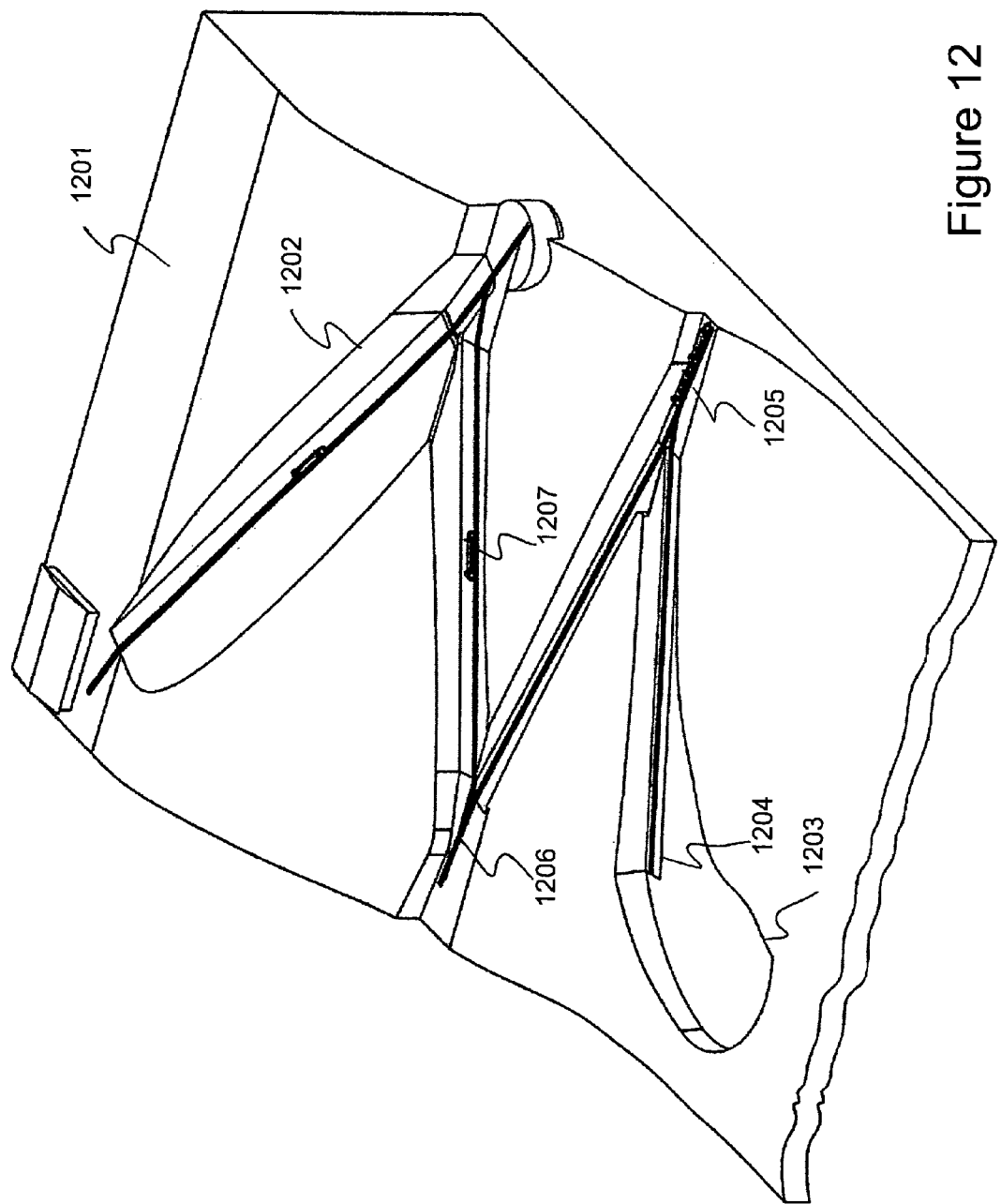
FIG. 12 is a schematic of a switchback track system with turn outs in an underground mine.

FIG. 12 is a schematic of a switchback track system with turn-outs in an underground mine. The mine shown in FIG. 12 is below surface 1201 and is accessed by a switchback decline 1202 which terminates at working face 1203. A single rail track 1204 is laid along the length of the decline. At each switchback 1206, a spur is positioned such that at least two self-powered burden cars 1205 can occupy the spur simultaneously in order that they can pass. Typically, an empty car descending the decline would park at the end of a spur so that a loaded car such as car 1207 ascending the decline can enter the spur and, when the track is switched, can exit the spur and continue its ascent. At the bottom of the decline, the track 1204 can be extended by utilizing panel track such as described for example in FIGS. 10 and 11. Once a section of decline adjacent to the working face is complete, the panel track can be replaced, if desired, by a more permanent track.

A similar track layout can be utilized for an open pit mine. This type of track configuration where grades as high as 15 degrees can be used would allow compact mine layouts to be considered which would, in turn, reduce mine development costs since less overall excavation would be required.

As the slope or grade angle of the track increases to angles over about 10 degrees, safety issues may arise. Two features of the rail car system of the present invention that address safety are the switch-back track layout and the use of the magnetic track brake. The magnetic brake in conjunction with frequent switch-backs can be effective in interrupting the uncontrolled descent of a runaway car.

Figure 13:
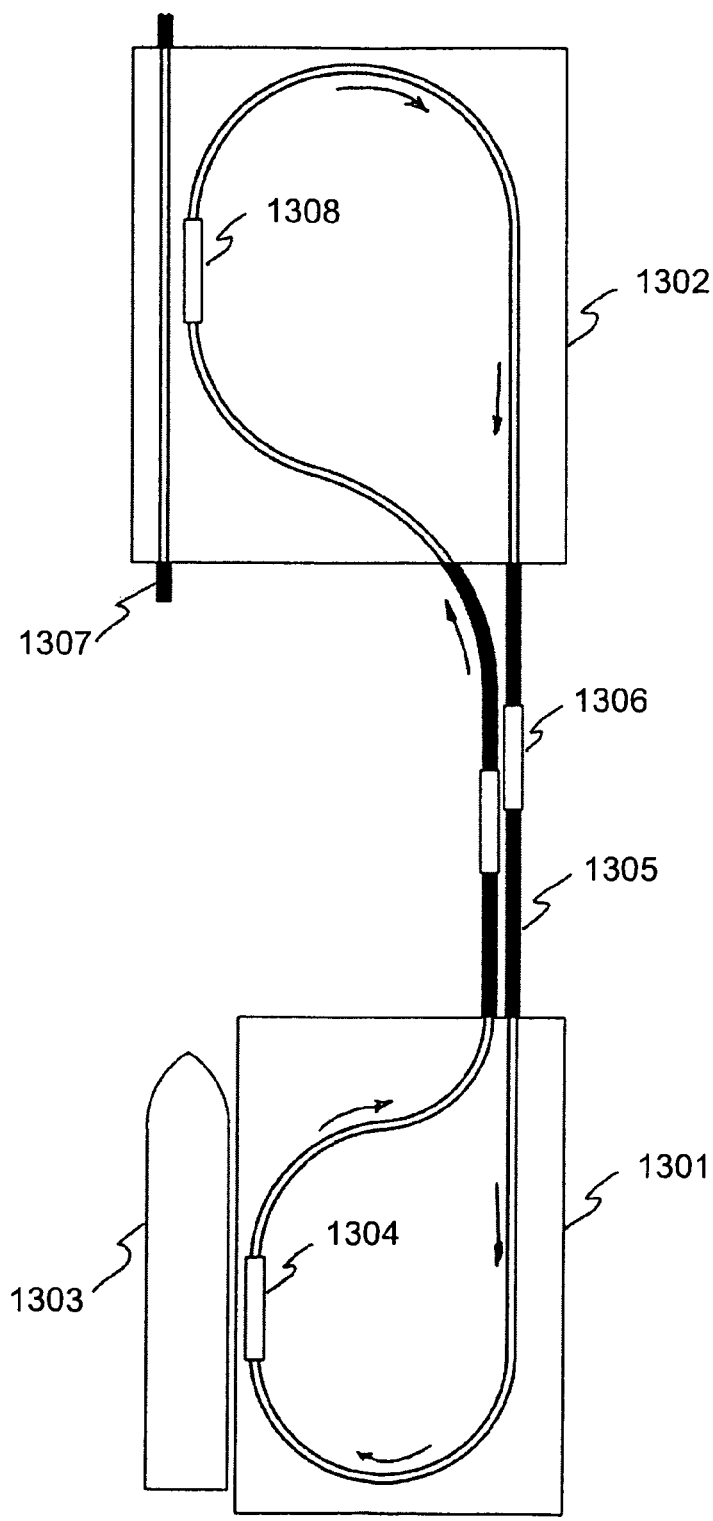
FIG. 13 is a schematic of a raceway track system in a marine port.

FIG. 13 is a schematic of a raceway track system illustrated by a configuration suitable for a marine port. Cargo enters the port region via ship 1303 or rail head 1307. Rail head 1307 may be replaced by a truck hub. The rail head or truck hub is typically within a few miles to up to about 100 miles from the ship port so that cargo is required to be transferred between the ship port and rail head or truck hub. In FIG. 13, a rail system utilizing automated self-powered cargo rail cars is illustrated. This system is designed to move cargo between the port and rail head or truck hub where a portion 1305 of the rail system may be electrified by an overhead wire or by a third rail while the areas surrounding the terminuses 1301 and 1302 are not electrified and the rail cars must proceed using on-board engine power or any of several means of energy storage power. The areas surrounding the terminuses 1301 and 1302 are typically free of overhead wires and third rail obstructions so conventional cargo handling equipment can be used. In this example, an automated self-powered cargo rail car 1304 is shown being loaded with cargo from ship 1303. Once loaded, the car proceeds to rail head or truck hub where car 1308 is unloaded. Once unloaded, the car proceeds back to the port to accept additional cargo. The cars proceed around the track in the direction indicated by the arrows. While in the areas at the terminuses 1301 and 1302, the cars may be powered by on-board engines if permitted by local air quality regulations. Alternately, the cars may be operated by using only its on-board energy storage system, such as a battery pack, so as to operate emissions free even when overhead wire or third rail grid power is not available.

As can be appreciated, the use of individual self-powered cars can lead to better overall time utilization. Loaded cars need not wait for the rest of the cars of a train to be loaded. The same applies to off-loading. Thus some of the cargo is always in transit and the flow of material is more uniform.

As can also be appreciated, it is possible to connect several self-powered cars of the present invention together to form a train. In this configuration, the train retains all the traction advantages of the individual cars and can still ascend or descend steep grades.

Control of Self-Powered Rail Cars and Rail Conveyance System

The system of the present invention can be automatically controlled such that it can pass through areas where different speed or emissions regulations apply and can be automatically adjusted to run at different speeds as well as adjusted to run on engine power, electrical grid power or power from an on-board energy storage unit.

The self-powered side rail car may be controlled remotely via a system of transponders at desired intervals along the track or by a satellite positioning system such as the GPS system. In one configuration, the transponder or signal emitter provides instructions (such as, for example, setting speed, tractive effort, acceleration, rail switching, and selection of propulsion means) to the rail car for a succeeding track section and/or, in a state machine-type control logic (where a plurality of states are defined with each state having a set of one or more operating parameters and different states having different operating parameter sets), may set a next state for the rail car over the succeeding track section. Thus, each of a number of transponders loads different instructions or states. The car may also be controlled by an operator or computer located either on the self-powered rail car or nearby and separated from the self-powered rail car. In the latter case, the self-powered rail car can be independently operable by an operator: on foot; in a vehicle not connected to the self-powered rail car; or in a building or in any other remote location in communication with the rail car. The operator would control the rail car by any number of remote control techniques, such as for example, a belt controller unit worn by the operator, a radio telemetry unit, a wireless unit such as a computer or cellular phone, an optical link or any other commonly known means of communication. The operator may also have a video linkage to the rail car such as for example by cameras located on the rail car. The cameras which are located on the rail car would be in communication with the remote location where the operator is situated. In addition to cameras operating in the visible light spectrum, other detection means can be used such as infrared, radar, acoustic and the like. These means of detection can be inputs into a computer control system. In another configuration, the rail car can be operated in fully automated mode under the partial or full direction of a computer program. Alternately, operational control can be handed off to a lead operator during the transport cycle. Such operation is preferred in operations that are repetitive and/or in dangerous areas such as radioactive mining or waste storage.

The self-powered rail cars may be controlled by different operators for different functions. For example, in a mine or port, a load control operator may take control of the rail car for loading and then hand off control to a dispatcher who co-ordinates the movement of the rail car to the unloading terminus. At the unloading terminus, an off-load control operator may take control of the rail car for unloading and then hand back control to the dispatcher who co-ordinates the return movement of the rail car to the loading terminus.

As can be appreciated, an entire rail conveyance system comprising a number of self-powered cars; multiple track switches and route options; various regions requiring changes from engine, grid and energy storage propulsion; speed changes; loading and unloading procedures; can be controlled from a single remote operations center with the option of handing off control locally, for example fo loading and unloading operations.

Figure 14:
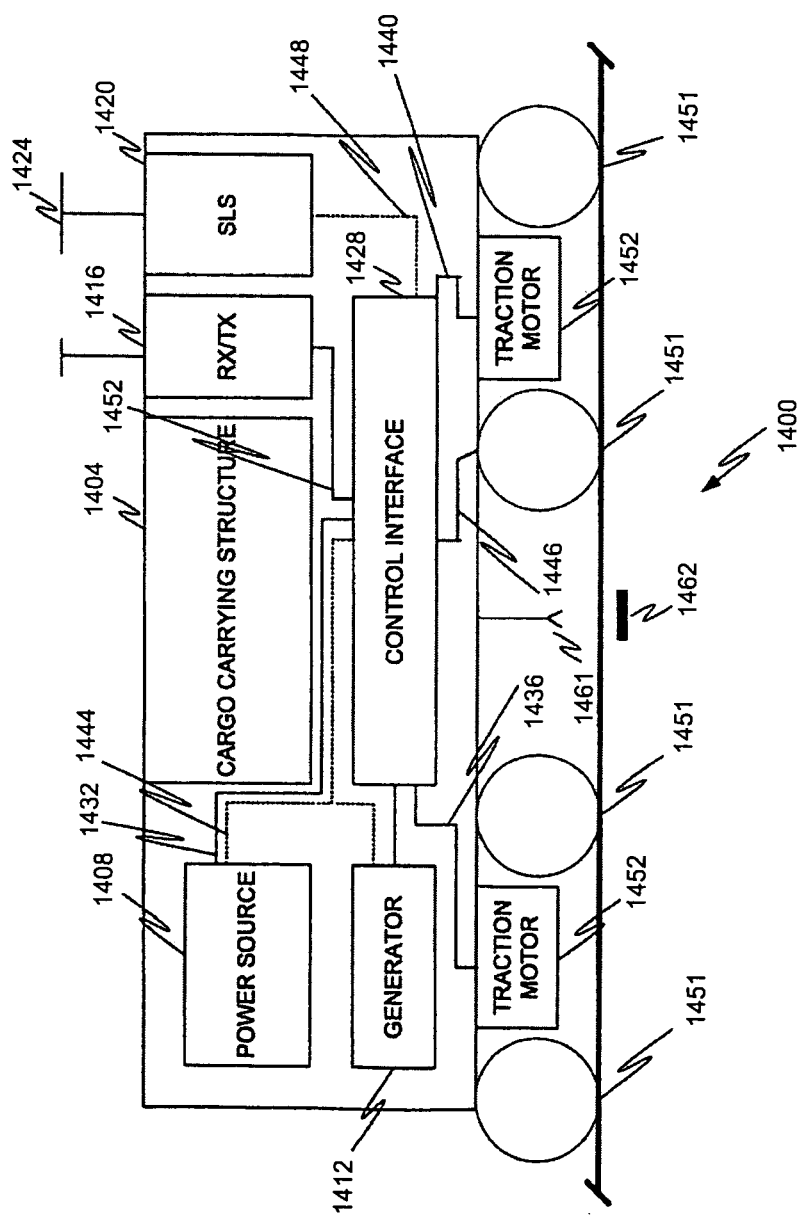
FIG. 14 is a block diagram of an automated rail car according to an embodiment.

FIG. 14 is a block diagram of a rail car according to an embodiment. The rail car 1400 includes a cargo carrying structure 1404, such as a fixed or tiltable flatbed, fixed or tiltable cargo box, and the like; a power source 1408, such as one or more of an engine, a battery pack, a power receiver (e.g. a pantograph, a trolley pole or the like) and associated circuitry, to receive and condition electrical energy from an overhead wire or electrified third rail, and the like; a generator (optional) 1412 to convert mechanical energy into electrical energy, traction motors 1452, to drive the axles (not shown) and respective wheel sets 1451, a transceiver 1416 to send and receive signals, satellite locating system ("SLS") 1420 and antenna 1424 to determine, relative to a satellite in geosynchronous orbit, a spatial location of the rail car 1404, and a (computerized) control interface 1428 to effect control of the rail car components and operations. FIG. 14 also shows a transponder 1462 buried under or near the track and a transponder interrogator 1461 located typically under rail car 1400.

The rail car 1400 includes a number of signaling links. Control signal lines 1432, 1436, and 1440 connect the power source 1408, generator 1412, and traction motors 1452. By the control signal lines, the interface 1428 is able to determine and change current component settings. Feedback lines 1444 and 1446 connect with sensors to provide desired measurements, including engine temperature, fluid pressure, engine revolutions per minute, rail car speed, rail car acceleration, currently traversed grade, fuel level, and available stored energy. Signaling line 1452 provides duplexed communications between the transceiver 1416 and interface 1428.

The control interface 1428 can have numerous configurations depending on the control mechanism employed. In one configuration, the rail car is controlled remotely by a human operator, and the control interface comprises logic to provide sensed information from on board sensors, such as accelerometers, thermocouples, thermometers, tacometers, speedometers, current sensors, voltage sensors, fuel level gauges, and the like, and collected information regarding the external surroundings, such as still, video images infrared images, radar images and acoustic images regarding selected external objects; receive, in response, commands from a human operator, de-packetize the commands, and distribute the commands to an appropriate on board component. In one configuration, the rail car has on board intelligence, which is typically a computer processor and processor readable and executable instructions, and an on-board memory (not shown) including an electronic representation of a section of the railway. This on-board logic can respond to hazards such as on-coming traffic, people, animals, rocks and the like on the track. The electronic representation includes one of rail section length, rail section grade, rail section configuration, rail section type, speed setting, maximum emission level, identity of power source to be used, and distance to a destination, a next way point, and/or from a starting point. Based on sensed and collected information and the electronic representation, the on board processor, executing the automation logic, generates appropriate commands. For example, the on board processor receives one or more of current location information from a satellite positioning system and a rail-side signal emitter (such as a transponder). The on board processor, based on the current location information and electronic representation, determines, from the automation logic, a value of the selected function. A first value of the selected function is an automated state and a second value of the selected function is one of a manual and remote control state. The second value is selected when the rail car is engaged in one of cargo load and cargo unload operations. In one configuration, the rail car has on board intelligence, receives, from signal emitters positioned at selected way points, selected information regarding the next track section and/or specific instructions for system adjustments (e.g., speed adjustments, tractive effort setting adjustments, power source selection, state changes and the like) to be made in preparation for the next track section. By way of example, the rail car can have multiple power sources, such as, in the case of a hybrid, an engine and an energy storage unit, such as a battery pack, connected electrically in parallel or series with the engine. The instructions can command the rail car to deactivate the engine and draw electrical energy from the energy storage unit or vice versa. In another example, the rail car includes an engine and has an energy receiver structure, such as a pantograph, to receive electrical energy from an electrified structure, such as an overhead wire or third rail. The instructions can command the rail car to deactivate the engine and draw electrical energy from the receiver structure or vice versa.

The interface 1428 can effect a state change in response to an interrupt command from a human operator, instructions received from a signal emitter, and/or a particular current geographic location signal. The logic is preferably implemented as a series of state machines, each one corresponding to a particular set of operations. Examples of state machines include travel low speed, travel medium speed, travel high speed, loading sequence, unloading sequence, and the like. In one configuration, the state change is effected among a manual control state in which the rail car is controlled remotely or locally by a human operator and an automated control state in which the rail car is controlled by on board instructions or logic as noted above. The automated control state is typically in effect during cargo haulage or in transit while the manual control state is in effect at the loading and unloading points. In one configuration, the state change is effected among a low emission mode in which most of the energy is received from an energy storage source and/or a receiver structure and a high emission mode in which most of the energy is received from an on board engine, for example.

Figure 15:
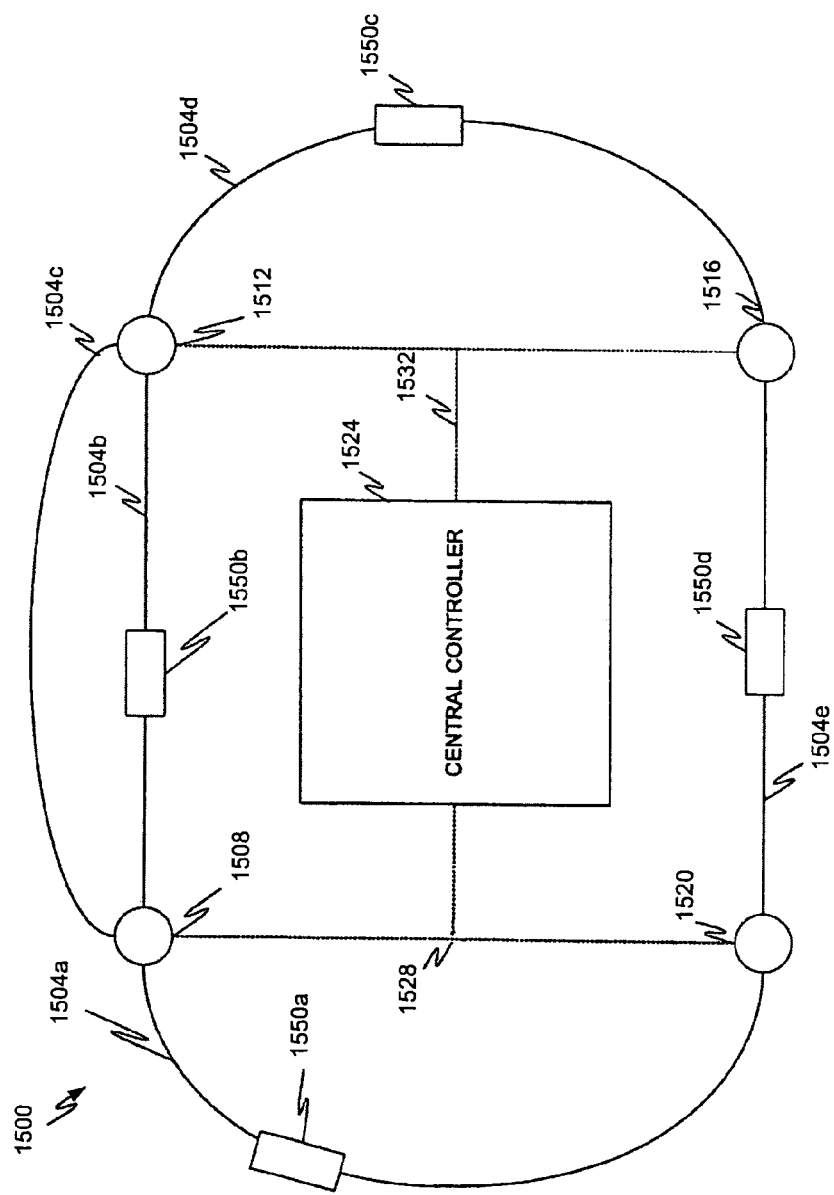
FIG. 15 is a block diagram of an automated railway according to an embodiment.

An example of a remote operations center, or central controller, is shown in FIG. 15. FIG. 15 depicts a rail system 1500 having a plurality of contiguous first, second, third, fourth, and fifth rail sections 1504*a-e*, a plurality of rail elements 1508 and 1512, signal emitters 1516 and 1520, and a central controller 1524. A number of moving rail cars 1550*a-d* are depicted on the railway. While the rail elements are depicted as switches, it is to be appreciated that other controllable rail elements are encompassed herein, such as rail/road crossings, rail traffic control lights, turn tables, transfer tables, elevators and the like. The central controller is linked to signal emitters and control units in the rail elements 1508 and 1512 and signal emitters 1516 and 1520 by and wired or wireless communication links 1528 and 1532. In operation, the central controller 1524 knows the geographic (spatial) locations of each of the rail cars 1550*a-d* due to the receipt of location signals from each rail car. As will be appreciated, each rail car has a unique identifier and periodically transmits sensed and collected information to the central controller 1524. The control interface (item 1428 in FIG. 14) receives information from each signal emitter for the next track section in the direction of travel. As a rail car approaches a rail element, the physical or spatial location of the rail car is determined by the central controller 1524 and suitable commands are forwarded to the rail element. For example, a switch setting is changed to direct the rail car 1550*a* to the second or third rail sections 1504*b* or *c*. In response to various stimuli, such as weather or traffic conditions the central controller 1524 can forward different sets of signals or instructions to the signal emitters to be provided to the rail car.

Example of a Large Oil Sands Surface Mine

Consider a large surface mine where ore is excavated by large power shovels. Such shovels may have a bucket with a capacity has high as about 80 cubic meters. Estimating an average density of excavated ore as about 1,500 kilograms per cubic meter, the bucket can hold an estimated 120 metric tonnes of ore. Currently, these mines might use large 400 ton mining trucks which could haul three 80 cubic meter buckets of ore. The self-powered cars of the present invention could be sized to carry up to 150 tons of ore and so could be filled with one bucket of excavated ore from an 80 cubic meter power shovel. As can be appreciated, self-powered rail cars can be designed to carry an integral number of excavator bucket or shovel loads.

As part of the present invention, a multi-tired or tracked carrier can be constructed with an adjustable platform wherein the platform includes a short length of track. The carrier could mate with the end of the track section adjacent to the working face area and a self-powered rail car could move onto the carrier platform. The carrier would transport the self-powered rail car so that it could be loaded by an excavator and then transport the self-powered rail car back to the nearest track ending where the self-powered rail car would be deposited for the return trip to an ore transfer station. Alternately, a short adjustable-length conveyor could be used to transfer ore from the excavator to the self-powered rail car.

A large oil sands surface mine might excavate about 500,000 tons of ore and about 500,000 tons of overburden material a day. Using 80 cubic meter power shovels, 10 such shovels producing about 6,600 tons per hour for 2 shifts would typically be required. Based on queuing theory, about 10 trucks would be about optimal to work with each shovel. Thus 100 trucks would be required. Utilizing the self-powered rail cars of the present invention, about 250 rail cars would be required. This example assumes 400 ton load capacity trucks and 150 ton load capacity rail cars.

As can be appreciated, it may be necessary to include sidings so that the self-powered rail cars can pass on the spurs leading to the working face area. In these cases it would be preferable to utilize panel track sections which are easier to lay down or remove. Also one or more rail car carriers or adjustable-length conveyors may be required to avoid queuing problems at the excavator site. It may be desirable in some situations to have a mobile storage apparatus as a "surge" reservoir for ore or waste rock to additionally help with queuing problems.

Economic Analysis

In June of 2009, Aventurine Engineering, Inc., was asked to evaluate the economic potential of an innovative ore and waste transport system design proposed by the present inventor. The design utilizes motorized drive units on individual rail cars, as opposed to the traditional approach of trailing a series of un-motorized cars behind a single locomotive. The individually motorized cars, as envisioned, would be directed to various load and dump points by an electronic dispatch system, and as such would be unmanned. In this way, individual haul units would report to be loaded only as needed and consequently a relatively continuous supply of material would either be fed to the mill or transported to waste stockpiles. Because the cars are individually mobile, large quantities of rock would not be sequestered in a long sequence of cars trailing a locomotive, as is the case in traditional rail transport systems. The approach of the present invention therefore reduces the size of the large, mine-run ore storage bins associated with traditional rail haulage systems. The individually motorized rail car design possesses several advantages over the more common rubber-tired transport vehicles as well. First, the rail effectively defines the haul paths and consequently removes the need for individual operators for each haul unit. Secondly, the tractive effort of the motorize rail car is considerably more efficient than the rubber-tired mode of transport. Improvements in tractive effort efficiencies of up to 20% can be expected through the rail drive systems. To study the economic impacts of the proposed design, Aventurine constructed two economic evaluation models. The first compares motorized rail cars with the traditional rubber-tired, rear dump truck haulage systems typically used at surface mines. The second compares the design of the present invention with an underground approach where articulated rear-dump (rubber-tired) trucks such as those often found at large block caving operations haul ore to the surface. While the models are used here to help define and understand the most appropriate applications of individual rail car plan, they are designed primarily as an evaluation tool to be used to evaluate the economic potential of the system as it applies to specific applications. The processes of loading and hauling ore and waste in mining situations are well understood. Items not yet fully evaluated in this study include track layout and placement in relation to the advances of an active face, the availability of the remote control systems needed to manage and direct the rail cars, and the specific tractive efficiencies that can be anticipated from the individually motorized haul units (although this last parameter can be predicted with some certainty). Reasonable estimates of the sizes and depths of resources are typically available by the time an engineer begins selecting equipment. These values can be used to develop ore and waste haul profiles, which in turn provide the information necessary to effectively estimate equipment, supply, and labor operating costs for all the primary excavators and haulers needed for any mining project. Because these haul profiles are the most critical parameters required in the models, the results that the models provide can be expected to be both representative and reliable.

In general, the individually motorized rail car system gains in economic advantage over rubber tired haulers as the total amount of material moved increases. This is due primarily to the fact that there is no direct correlation between the number of motorized rail cars and the number of employees. In the scenarios examined, operations that produce over roughly 20,000 tons per day combined ore and waste and that use motorized rail cars may very well realize economic benefits over mines that rely on a traditional approach in which rubber-tired, rear-dump haulers provide the primary means of ore and waste transport. In fact, through the process of constructing the models, it has become clear that very often significant cost savings can be achieved through the use of motorized rail cars for haulage. These cost savings are realized primarily through reductions in the requirements for labor and, to a lesser degree, energy. However, these savings can be impacted significantly by the supply costs associated with the rail system. In essence, the purchase and installation of new track must be kept to a minimum in order to realize the full cost savings associated with motorized rail cars. The present invention represents an economically significant idea. It appears that, even for moderately sized operations, if the cars work as expected the potential overall cost savings to operators over the life of a project could be in the millions.

A number of variations and modifications of the inventions can be used. As will be appreciated, it would be possible to provide for some features of the inventions without providing others. For example, the self powered cars can be used individually or in short consists to move passengers. This application is especially suited to moving passengers from a low elevation transportation hub to, for example, ski resorts, where there are steep grades en route.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. One or more burden rail cars, the one or more burden rail cars each comprising:
   (a) a structure for carrying cargo;
   (b) a plurality of truck assemblies, each truck assembly comprising one or more axles;
   (c) an on-board power source to provide propulsion power to at least one of the axles of each of the one or more burden rail cars; and
   (d) a control interface operable to receive and process commands, and to execute selected functions, the selected functions comprising a plurality of start, brake, speed setting, gear setting, power source activation, power source deactivation, load cargo, and unload cargo, wherein the commands are received from at least one of: i) a remotely located operator, ii) a remotely located computer executing automation logic, and iii) an on-board processor executing automation logic.

2. The one or more burden rail cars of claim 1, wherein the power source is at least one of an engine, a battery pack, and a power grid current collector, wherein a ratio of the number of driver axles to the number of total axles in the plurality of truck assemblies is at least 0.167, wherein the structure for carrying cargo is configured to carry at least approximately 20 tons, and wherein the rail car is configured to ascend, without wheel slippage, a grade of at least 10 degrees.

3. The one or more burden rail cars of claim 1, wherein the commands are received from at least one of a remotely located operator and computer, wherein the control interface is configured to collect a plurality of measured parameters from on board sensors and provide the measured parameters to the at least one of the remote operator and computer, wherein the measured parameters comprise engine temperature, fluid pressure, engine revolutions per minute, rail car speed, rail car acceleration, currently traversed grade, fuel level, and available stored energy, and wherein the control interface is configured to collect at least one of still and video images of at least one of a portion of the rail car and an object near the rail car.

4. The one or more burden rail cars of claim 1, further comprising a remotely located or on-board memory including an electronic representation of a section of a railway, wherein the commands are received from at least one of a remotely located and on-board processor executing automation logic, wherein the at least one of the remotely located and on-board processor receives at least one of current location information from a satellite positioning system and a rail-side signal emitter, wherein the at least one of the remotely located and on board processor, based on the current location information and electronic representation, determines, from the automation logic, a value of the selected function.

5. The one or more burden rail cars of claim 4, wherein a first value of the selected function is automated state and a second value of the selected function is one of manual and remote control state and wherein the second value is selected when the one or more burden rail cars is engaged in one of cargo load and cargo unload operations.

6. The one or more burden rail cars of claim 4, wherein the electronic representation comprises one of rail section length, rail section grade, rail section configuration, rail section type, speed setting, maximum emission level, identity of power source to be used, and distance to a destination.

7. The one or more burden rail cars of claim 1, wherein the power source is a power grid current collector that receives power from at least one of an overhead wire and an electrified third rail, wherein a ratio of the number of driver axles to the number of total axles in the plurality of trucks is at least 0.167, and wherein the one or more burden rail cars is configured to ascend, without wheel slippage, a grade of at least 10 degrees.

8. The one or more burden rail cars of claim 1, wherein all of the axles of the one or more burden rail cars are powered.

9. The one or more burden rail cars claim 1, further comprising a gear box and a cardon shaft, the cardon shaft engaging the gear box and the at least one powered axle.

10. The one or more burden rail cars of claim 1, further comprising at least one traction motor engaging at least one axle, wherein the on-board power source is at least one of an engine, an energy storage system and a power grid current collector, wherein the power source drives at least one of a generator, an alternator, and a hydraulic pump to power the at least one traction motor.

11. The one or more burden rail cars of claim 1, wherein the one or more burden rail cars is part of a consist comprising multiple burden cars and wherein, for all of the burden cars in the consist, a ratio of the number of driver axles to the number of total axles is at least 0.167.

12. A method, comprising:
(a) providing a haulage railway, the railway having at least one loading point and at least one unloading point;
(b) providing a plurality of burden rail cars traversing the haulage railway, each of the burden rail cars comprising:
(B1) a structure for carrying cargo;
(B2) a plurality of truck assemblies, each truck assembly comprising one or more axles;
(B3) an on board power source to provide propulsive power to at least one of the axles of the one or more burden rail cars; and
(B4) a control interface operable to receive and process commands, to execute selected functions, the selected functions comprising a plurality of start, brake, speed setting, gear setting, power source activation, power source deactivation, load cargo, and unload cargo, wherein the commands are received from at least one of: i) a remotely located operator, and ii) an on board processor executing automation logic; and
(c) loading each burden rail car with cargo at the at least one loading point and unloading, from each burden rail car, the cargo at the at least one unloading point.

13. The method of claim 12, wherein the railway is at least one of a raceway, a switchback, and a single track with turnouts to permit burden rail cars to move back and forth between the loading and unloading points, wherein the cargo is excavated material, wherein a mine face near the loading point moves, wherein the railway comprises panel track section, and wherein the panel track is reconfigured to maintain the loading point in spatial proximity to the mine face as the mine face moves.

14. The method of claim 12, wherein the railway is at least one of a raceway, a switchback, and a single track with turnouts to permit rail cars to move back and forth between the loading and unloading points, wherein the railway has at least one section with a grade of at least 10 degrees, wherein the railway comprises a plurality of switchbacks, each switchback comprising a spur to permit at least two burden rail cars to park on the spur while a loaded burden rail car ascends the railway.

15. The method of claim 12, wherein the loading point is nearby a ship docking facility and the unloading point is nearby a rubber tired truck loading facility or a railroad terminus and wherein the railway is a loop to permit burden rail cars to move back and forth between the loading and unloading points without emissions.

16. The method of claim 12, wherein the burden rail cars are at least one of remotely operated and automated along at least most of a first section of the railway, the first section extending between the loading and unloading points, and wherein the burden rail cars are at least one of manually and remotely operated at each of the loading and unloading points.

17. The method of claim 12, wherein the railway crosses over or under a roadway and wherein a grade of the crossover is at least 10 degrees.

18. The method of claim 12, wherein the commands are received from a remotely located operator and further comprising:

collecting, by the control interface of a selected burden rail car, a plurality of measured parameters from on board sensors;

collecting, by the control interface of the selected burden rail car, at least one of still and video images of at least one of a portion of the burden rail car and an object near the burden rail car; and providing, by the control interface of the selected burden rail car, the measured parameters to the remote operator, wherein the measured parameters comprise engine temperature, fluid pressure, engine revolutions per minute, speed, acceleration, currently traversed grade, fuel level, and available stored energy; position of electrical current collector apparatus; and receiving and processing, by the control interface of the selected burden rail car, commands from the operator.

19. The method of claim 12, wherein a selected burden rail car comprises at least one of a remotely located and on-board memory including an electronic representation of a section of a railway and wherein the commands are received from an on board processor executing automation logic and further comprising:

receiving, by the on board processor, at least one of current location information from a satellite positioning system and a rail-side signal emitter;

determining, by the on board processor and based on the current location information and electronic representation, a value associated with the selected function; and inputting, by the on board processor, the value in the automated logic to generate a command.

20. The method of claim 19, wherein a first value of the selected function is automated state and a second value of the selected function is one of manual and remote control state and wherein the second value is selected when the burden rail car is engaged in one of cargo load and cargo unload operations.

21. The burden rail car of claim 19, wherein the electronic representation comprises one of rail section length, rail section grade, rail section configuration, rail section type, speed setting, maximum emission level, identity of power source to be used, and distance to a destination.

22. A system, comprising:
a railway having at least one controllable rail element;
a plurality of self-propelled burden rail cars on the railway, each of the self-propelled burden rail cars comprising a cargo carrying structure, an on-board power source driving the driver axle of each of the burden rail cars, at least one driver axle, a transceiver, and a control interface, the control interface being operable to control selected operations of the respective rail car; and
a central controller operable to:
receive, from a selected burden rail car a current spatial location of the selected burden rail car;
identify a controllable rail element in a path of travel of the selected burden rail car;
determine whether the selected burden rail car is loaded or unloaded; and
in response, provide a command to the controllable rail element prior to arrival of the selected burden rail car.

23. The system of claim 22, wherein the controllable rail element is one of a switch, rail/road crossing, rail traffic control light, turn table, transfer table and elevator.

24. The system of claim 22, further comprising a plurality of signal emitters, each signal emitter being associated with a predetermined section of the railway and providing to a passing burden rail car at least one of rail car configuration instructions for the corresponding predetermined section of the railway and section information for at least one characteristic of the corresponding predetermined section of the railway.

25. The system of claim 24, wherein a signal emitter provides to a passing burden rail car rail car configuration instructions and wherein the burden rail car configuration instructions comprise at least one of the following settings to be employed over the corresponding predetermined railway section: a speed setting, a gear setting, a notch setting, a power source type, and a state setting.

26. The system of claim 24, wherein a signal emitter provides to a passing burden rail car section information for at least one characteristic of the corresponding predetermined section of the railway, the section information comprising rail section length, rail section grade, rail section configuration, rail section type, speed setting, maximum emission level, distance from a selected point on the railway, and distance to a selected point on the railway.

* * * * *